(12) United States Patent
Yamada et al.

(10) Patent No.: US 9,487,092 B2
(45) Date of Patent: Nov. 8, 2016

(54) DRIVING DEVICE FOR IN-WHEEL MOTOR VEHICLES

(75) Inventors: Hiroyuki Yamada, Iwata (JP); Takeshi Kanda, Iwata (JP); Koichi Okada, Iwata (JP)

(73) Assignee: NTN CORPORATION, Osaka (JP)

( * ) Notice: Subject to any disclaimer, the term of this patent is extended or adjusted under 35 U.S.C. 154(b) by 50 days.

(21) Appl. No.: 13/985,835

(22) PCT Filed: Feb. 10, 2012

(86) PCT No.: PCT/JP2012/053056
§ 371 (c)(1),
(2), (4) Date: Aug. 15, 2013

(87) PCT Pub. No.: WO2012/114897
PCT Pub. Date: Aug. 30, 2012

(65) Prior Publication Data
US 2013/0320677 A1    Dec. 5, 2013

(30) Foreign Application Priority Data

Feb. 25, 2011    (JP) .................................. 2011-039231

(51) Int. Cl.
*B60L 11/00* (2006.01)
*H02M 3/158* (2006.01)
*B60K 7/00* (2006.01)
(Continued)

(52) U.S. Cl.
CPC .............. *B60L 11/00* (2013.01); *B60K 7/0007* (2013.01); *B60K 17/356* (2013.01); *B60L 15/007* (2013.01); *B60L 15/08* (2013.01); *H02M 3/1584* (2013.01); *B60K 2007/0038* (2013.01); *B60K 2007/0092* (2013.01); *B60L 2220/44* (2013.01); *B60L 2220/46* (2013.01); *H02M 7/003* (2013.01);
(Continued)

(58) Field of Classification Search
CPC .................... B60K 17/356; B60K 2007/0038; B60K 2007/0092
USPC ......................................... 290/45; 180/65.51
See application file for complete search history.

(56) References Cited

U.S. PATENT DOCUMENTS 7,969,735 B2   6/2011 Nakatsu et al.
7,978,468 B2   7/2011 Nakatsu et al.
(Continued)

FOREIGN PATENT DOCUMENTS

CN    101678778    3/2010
CN    101964625 A  2/2011
(Continued)

OTHER PUBLICATIONS

US 8,875,821, 11/2014, Ono et al. (withdrawn)
(Continued)

*Primary Examiner* — Tulsidas C Patel
*Assistant Examiner* — Sean Gugger

(57) ABSTRACT

To provide a driving device for an in-wheel motor vehicle that can be reduced in size, weight and cost, the driving device for the in-wheel motor vehicle includes a plurality of in-wheel motor assemblies, which are disposed in at least two of a plurality of drive wheels, and a plurality of motor drivers for controlling those in-wheel motor assemblies. Each of the motor drivers includes a smoothing circuit, a control unit, an inverter unit and a cooler for cooling the inverter unit. The plurality of the motor drivers are put together at one location and disposed within the common casing.

14 Claims, 22 Drawing Sheets

(51) Int. Cl.
   *B60K 17/356* (2006.01)
   *B60L 15/00* (2006.01)
   *B60L 15/08* (2006.01)
   *H02M 7/00* (2006.01)
   *H02P 5/00* (2016.01)
   *H02M 1/00* (2006.01)

(52) U.S. Cl.
   CPC .......... *H02M 2001/008* (2013.01); *H02P 5/00* (2013.01); *Y02T 10/645* (2013.01)

(56) References Cited

U.S. PATENT DOCUMENTS

| | | | |
|---|---|---|---|
| 8,310,084 | B2 | 11/2012 | Pugsley et al. |
| 8,919,468 | B2 | 12/2014 | Ono et al. |
| 2002/0027789 | A1 | 3/2002 | Okushima et al. |
| 2005/0100330 | A1 | 5/2005 | Su et al. |
| 2006/0169506 | A1* | 8/2006 | Handa et al. ............. 180/65.5 |
| 2006/0180365 | A1* | 8/2006 | Innami et al. ............ 180/65.5 |
| 2006/0182365 | A1 | 8/2006 | Park et al. |
| 2008/0053726 | A1* | 3/2008 | Marsh et al. ............. 180/65.5 |
| 2010/0084206 | A1* | 4/2010 | Yoshida et al. ............ 180/65.1 |
| 2010/0156172 | A1 | 6/2010 | Pugsley et al. |
| 2010/0188813 | A1* | 7/2010 | Nakatsu et al. ............ 361/689 |
| 2010/0188814 | A1 | 7/2010 | Nakatsu et al. |

FOREIGN PATENT DOCUMENTS

| | | |
|---|---|---|
| EP | 2006989 | 12/2008 |
| JP | 1-157265 | 6/1989 |
| JP | 6-303704 | 10/1994 |
| JP | 7-30271 | 1/1995 |
| JP | 7-67213 | 3/1995 |
| JP | 7-89355 | 4/1995 |
| JP | 10-304695 | 11/1998 |
| JP | 2005-57928 | 3/2005 |
| JP | 2005-192311 | 7/2005 |
| JP | 2007-089259 | 4/2007 |
| JP | 2007-195292 | 8/2007 |
| JP | 2008-86107 | 4/2008 |
| JP | 2008-109727 | 5/2008 |

OTHER PUBLICATIONS

International Preliminary Report on Patentability issued on Sep. 6, 2013 in International Application No. PCT/JP2012/053056.
Japanese Office Action issued Jul. 15, 2014 in corresponding Japanese Patent Application No. 2011-039231.
International Search Report mailed May 1, 2012 in corresponding International Application No. PCT/JP2012/053056.
Japanese Notice of Rejection issued Feb. 17, 2015 in corresponding Japanese Patent Application No. 2011-039231.
Chinese Office Action dated Jul. 2, 2015 in corresponding Chinese Patent Application No. 201280010174.5.
European Search Report issued Aug. 4, 2015 in corresponding European Patent Application No. 12749620.6.
Japanese Office Action mailed Feb. 2, 2016 in related Japanese Application No. 2015-098934.
Chinese Office Action dated Mar. 2, 2016 in corresponding Chinese Patent Application No. 201280010174.5.
Japanese Notification of Reasons for Rejection dated Apr. 4, 2016 in corresponding Japanese Patent Application No. 2011-39231.
Japanese Decision on Grant dated Jul. 19, 2016 in corresponding Japanese Patent Application No. 2015-098934.

* cited by examiner

SINUSOIDAL WAVE DRIVE (PWM)

Fig. 9A

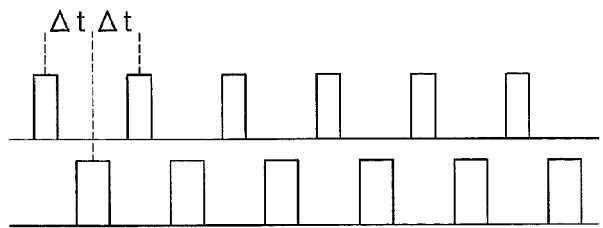

ON TIMING OF DRIVING ELEMENT
OF MOTOR DRIVER 4A

ON TIMING OF DRIVING ELEMENT
OF MOTOR DRIVER 4B

Fig. 9B

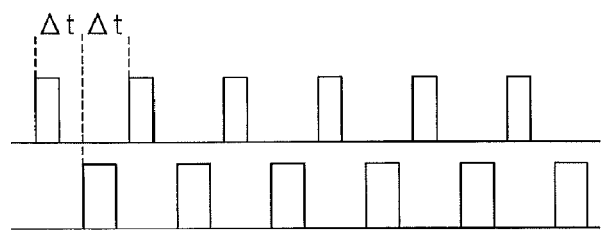

ON TIMING OF DRIVING ELEMENT
OF MOTOR DRIVER 4A

ON TIMING OF DRIVING ELEMENT
OF MOTOR DRIVER 4B

Fig. 9C

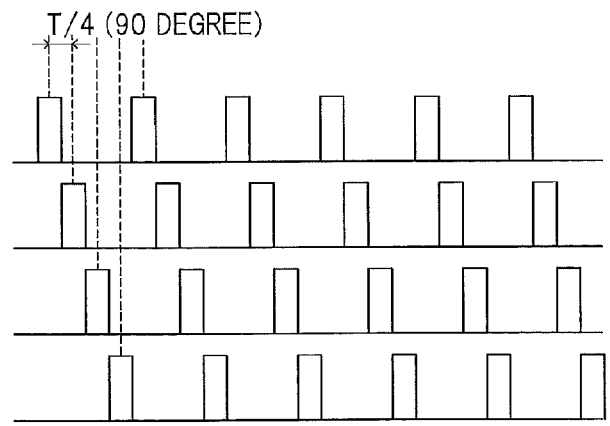

ON TIMING OF DRIVING ELEMENT
OF MOTOR DRIVER 4A

ON TIMING OF DRIVING ELEMENT
OF MOTOR DRIVER 4B

ON TIMING OF DRIVING ELEMENT
OF MOTOR DRIVER 4C

ON TIMING OF DRIVING ELEMENT
OF MOTOR DRIVER 4D

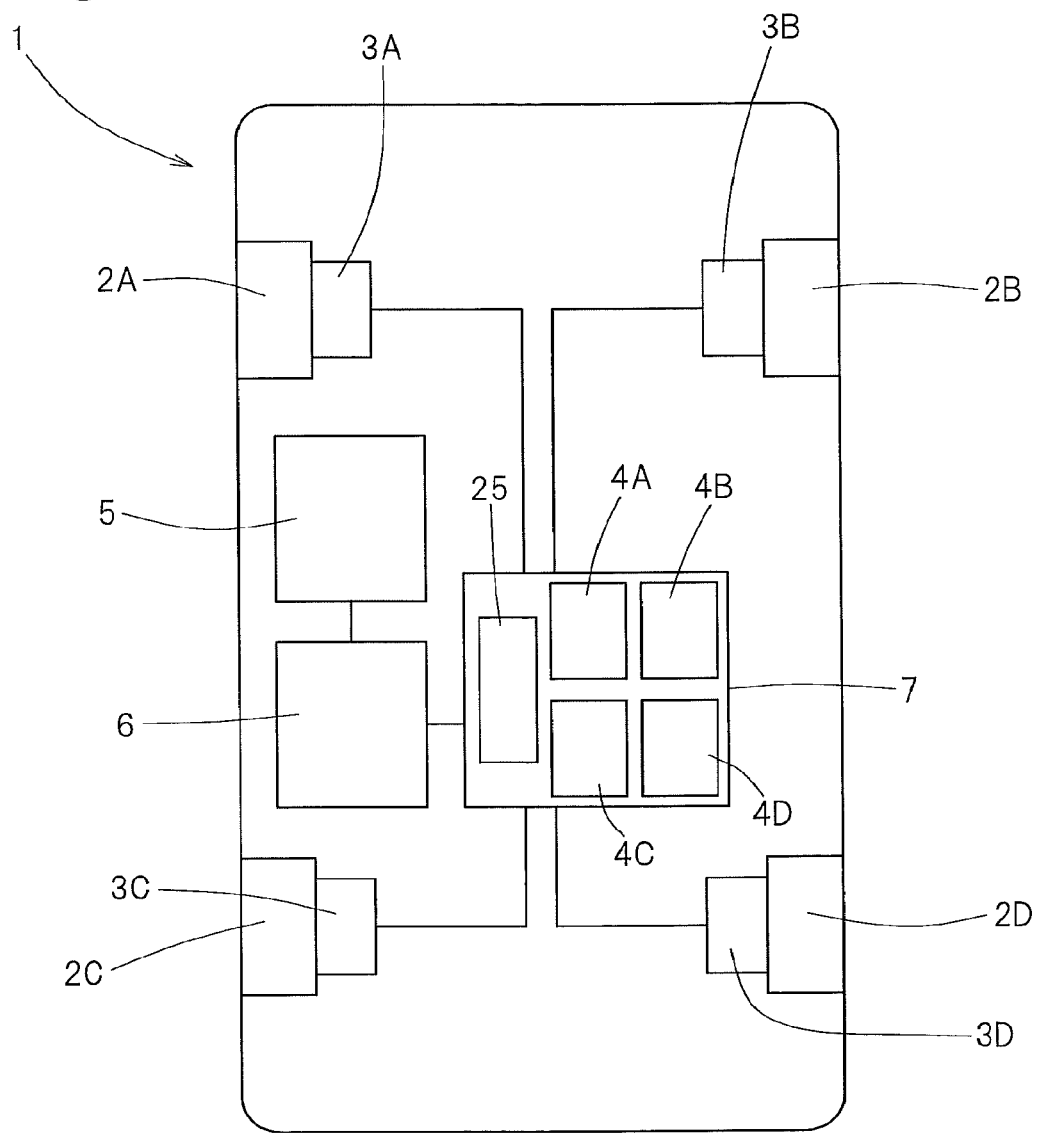

Fig. 19
(A)
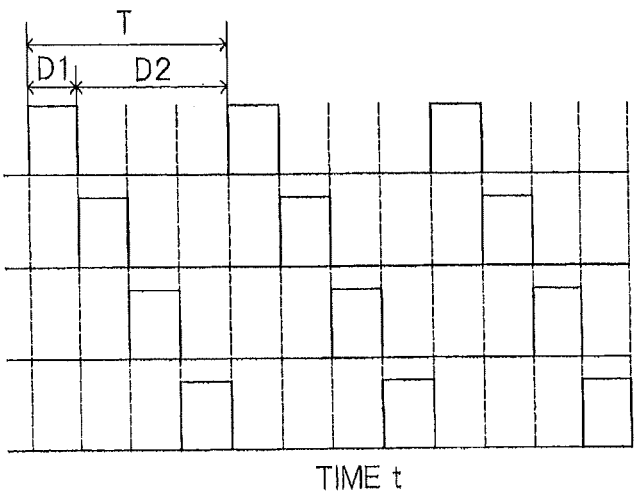
OUTPUT SEGMENT 26a COMMAND
OUTPUT SEGMENT 26b COMMAND
OUTPUT SEGMENT 26c COMMAND
OUTPUT SEGMENT 26d COMMAND
TIME t
(B)
RECTIFIER CURRENT Id1
RECTIFIER CURRENT Id2
RECTIFIER CURRENT Id3
RECTIFIER CURRENT Id4
TIME t
(C)
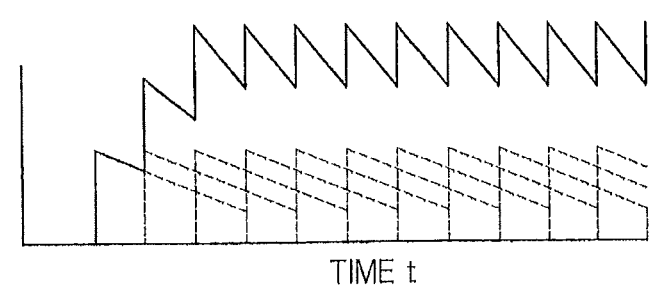
CAPACITOR RIPPLE CURRENT (A)
TIME t

DRIVING DEVICE FOR IN-WHEEL MOTOR VEHICLES

CROSS REFERENCE TO THE RELATED APPLICATION

This application is a U.S. national stage application of PCT/JP2012/053056 filed Feb. 10, 2012 and claims foreign priority benefit of Japanese Application No. 2011-039231 filed Feb. 25, 2011 in the Japanese Intellectual Property Office, the contents of both of which are incorporated herein by reference.

BACKGROUND OF THE INVENTION

1. Field of the Invention

The present invention relates to an in-wheel motor vehicle such as, for example, an electric powered car, a fuel cell powered car or any other hybrid car, in which at least two drive wheels of a plurality of drive wheels make use of an in-wheel motor.

2. Description of Related Art

It has generally been known that in an in-wheel motor vehicle such as, for example, an electric powered car, a fuel cell powered car or a hybrid car in which an in-wheel motor is incorporated in at least two of a plurality of drive wheels, a motor driver of a kind is necessitated, which is comprised of an inverter unit and an inverter control unit in order to control the in-wheel motors. For further discussion, reference will now be made to a related art example shown in FIG. 29. The conventional four wheeled, in-wheel motor vehicle, shown in FIG. 29, makes use of front left and right wheels 32A and 32B and rear left and right wheels 32C and 32D with respective in-wheel motor assemblies 33A to 33D incorporated therein. The in-wheel motor assemblies 33A to 33D are associated with respective motor drivers 34A to 34D that are separately disposed at locations neighboring the corresponding in-wheel motor assemblies 33A to 33D. A direct current electric power is supplied from a vehicle mounted battery 35 to those motor drivers 34A to 34D through a battery control unit 36. A booster circuit may be additionally provided in each of the motor drivers 34A to 34D to increase a power source voltage from the battery 35 for the purpose of increasing the driving efficiency.

As a cooling device for cooling the inverter unit in the motor drive unit of the in-wheel motor vehicle, the use has hitherto been suggested of a cooler capable of absorbing crash energies at the time of the vehicle collision (see the patent document 1 listed below). According to this patent document, the motor driver is disposed on one side of the cooler and both of a smoothing capacitor and a DC/DC converter are disposed on the opposite side.

Also, as another related example of the motor driver, a suggestion has been made to use a plurality of control sections, equipped in the motor driver, on both surfaces of a cooler and to use a cooler having a performance lower than the sum of respective calorific values of the control sections (see the patent document 2 listed below). According to this second mentioned patent document, an air conditioner inverter and a DC/DC converter are enumerated as specific examples of the control sections that are disposed on both surfaces of the cooler.

As a further related example, the suggestion has also been made to dispose various inverter, capacitor and a high voltage converter, which are component parts of the motor driver, on an upper surface of a component mount plate and to dispose a control section, a reactor for a high voltage converter, a DC/DC converter and low voltage components, which are associated with the inverter unit, on a lower surface of the component mount plate. In this respect, see the patent document 3 listed below.

PRIOR ART DOCUMENTS

[Patent Document 1] JP Laid-open Patent Publication No. H06-303704
[Patent Document 2] JP Laid-open Patent Publication No. H07-67213
[Patent Document 3] JP Laid-open Patent Publication No. 2005-57928

DISCLOSURE OF THE INVENTION

It has, however, been found that as is the case with the related example shown in and described with reference to FIG. 29, placement of the plurality of the motor drivers 34A to 34D and the boosting circuits requires a substantial space, thus constituting a cause of an increase of the weight and that of the cost. The example disclosed in the patent document 1 listed above is applicable to the case in which only one motor driver is used, and this patent document 1 does not deal with the use of the plurality of the motor drivers such as in the in-wheel motor vehicle.

In the example disclosed in the patent document 2 listed above, while the plurality of control sections are disposed on both surfaces of the cooler, only the air conditioner inverter and the DC/DC converter are enumerated as specific examples of the control sections. Although depending on the manner in which the plurality of the control sections are combined, more different effects may be expected, this patent document 2 is silent as to the in-wheel motor vehicle having the plurality of the motor drivers and the boosting circuits.

In the example disclosed in the patent document 3 listed above, although the total volume of the driving devices may be possibly reduced, an organized large planer space is required in the vehicle and, hence, the space for installation is limited and the degree of freedom of arrangement is also small. Also, since the inverter unit is disposed on the upper surface of the component mount plate and the control sections are disposed on the lower surface thereof, the structure tends to become complicated.

As discussed hereinabove, since in the in-wheel motor vehicle, the plurality of the motor drivers and the boosting circuits are mounted thereon, the space therefore is necessitated and, hence, there is a possibility that the weight and the cost may increase. However, any of the patent documents 1 to 3 is incapable of resolving those problems.

In view of the foregoing, the present invention is intended to provide an in-wheel motor vehicle capable of being reduced in size, weight and cost. Another object of the present invention is to provide the in-wheel motor vehicle of the kind referred to, in which the size, weight and cost of devices used to drive in-wheel motors can be reduced.

In order to accomplish these objects, a driving device for an in-wheel motor vehicle in accordance with the present invention includes a plurality of in-wheel motor assemblies incorporated in at least two of a plurality of drive wheels of the vehicle and a plurality of motor drivers for controlling the respective in-wheel motor assemblies, the motor drivers including a smoothing circuit, an inverter unit and an inverter control unit for controlling the inverter unit and a cooler for cooling the inverter unit; in which the plurality of the motor drivers are disposed within a single common casing and, the plurality of the motor drivers share either one or both of component parts of those motor drivers and components concomitant to those motor drivers.

According to the above described construction, since the plurality of the motor drivers are put together at one location and are then arranged within the common casing, it becomes possible to share component parts and concomitant components among the plurality of the motor drivers. By way of example, smoothing circuits and coolers can be shared among the plurality of the motor drivers. Also, calculators of the inverter control unit, for example, can be shared among the plurality of the motor drivers. For this reason, the reduction in size, weight and cost of the driving device can be achieved.

In one embodiment of the present invention, the use may be made of a booster unit for boosting a power supply voltage from an power source, in which case the booster unit includes a booster control section, a driving element, a reactor and a rectifier and is disposed within the common casing. Disposition of the booster unit within the common casing makes it possible to share the cooler therefor and, hence, a further reduction in size, weight and cost can be accomplished.

The plurality of the motor drivers disposed within the common casing may share one smoothing circuit as the smoothing circuit. Also, the plurality of the motor drivers disposed within the common casing share one cooler as the cooler. Since the plurality of the motor drivers are provided within the common casing, the electric current to be supplied to the plurality of the motor drivers can be smoothened with one smoothing circuit and, also, the plurality of the motor drivers can be cooled with one cooler.

The cooler referred to above may be of a water cooling type. If the cooler is of the water cooling type, the cooling efficiency is good as compared with the air cooled type. In the case of the water cooling type, a circulating system for a coolant is needed, but since the plurality of the motor drivers are arranged within the common casing, an increase of the cost attributable to the circulating system can be suppressed.

In one embodiment of the present invention, the cooler may have opposite surfaces held in back-to-back relation with each other and formed as cooling surfaces, and wherein a motor driver main body, which is a part constituted by the inverter unit and the inverter control unit of the motor driver may be disposed on the opposite surfaces of the cooler to thereby position the inverter unit on both sides of the cooler. Where as described above the cooler for each of the motor driver main bodies is divided to and is disposed on both sides of the cooler, the cooler can be downsized and the cooling efficiency of the cooler can be increased. As a result, the reduction in size, weight and cost of the driving device can be made possible.

A motor driver main body, which is a part of the motor driver excluding the cooler in the motor driver, may be disposed on one side of the cooler to thereby position the inverter unit on one surface side of the cooler. In this case, each of the motor drivers may include a booster unit for boosting a power supply voltage from an power source, the booster unit including a booster control section, a driving element, a reactor and a rectifier; and in which the cooler has opposite surfaces held in back-to-back relation with each other and formed as cooling surfaces; and the booster unit is disposed on the other surface side of the opposite surfaces of the cooler, that is opposite surface side on which the inverter unit is disposed, to thereby position the driving element of the booster unit on the other surface side of the opposite surfaces of the cooler. By so doing, with the utilization of the opposite cooling surfaces of the cooler, both of the inverter and the driving elements of the booster unit can be efficiently cooled.

In one embodiment of the present invention, the inverter units of the plurality of the motor drivers may be integrated together so that at least a portion of each of them may be shared. For example, the inverter control unit may include a first calculator, the first calculator being shared by the plurality of the inverter control units. With the inverter control unit integrated together, communication cables, harnesses and connectors thereof can be shared to reduce the size and cost thereof.

Also, each of the motor drivers may further includes a booster unit for boosting a power supply voltage from an power source, in which case the booster units include booster control sections, driving elements, reactors and rectifiers; and in which the plurality of the motor drivers are integrated together so that the inverter control unit and the booster control section of the booster units may be at least partly shared among the plurality of the motor drivers. In this case, the booster control section may include a second calculator and in which with the first calculator of the inverter control unit and the second calculator of the booster control section shared, the inverter control unit and the booster control section are integrated together. With the calculators shared, information on, for example, motors and statuses (for example, the number of rotation, current values and temperatures) of the motor driver can be simply shared with no long communication paths employed and, hence, the structure can be simplified.

Where the inverter control units of the plurality of the motor drivers are so integrated together that at least a part of them can be shared, the inverter control units of the plurality of the motor drivers may be of a control type capable of driving the driving element of the inverter unit according to the PWM (Pulse Width Modulation) scheme and the plurality of the motor drivers may have equal cycles of PWM relative to each other and displace an ON and OFF timings of the driving element. Where the inverter control units of the plurality of the motor drivers are integrated together, by displacing the ON and OFF timings of the driving elements, the ripple current towards the smoothing circuit can be reduced. Since with the calculators shared, the driving element ON timing of the plurality of the motor drivers can be easily controlled, the timings can be displaced in that way.

Where the ON and OFF timings are displaced, the plurality of the motor drivers may displace the ON timings so that the center of an ON timing of the driving element of each of the motor drivers comes to have an equal interval by dividing the PWM cycle by the number of the motor drivers. The plurality of the motor drivers may displace the ON timings so that the start point of an ON timing of the driving element of each of the motor drivers comes to have an equal interval by dividing the PWM cycle by the number of the motor drivers. Having been displaced the equal interval in the manner described above, the peak value of the ripple current from the smoothing capacitor which has been shared can be reduced and, hence, the smoothing capacitor can be downsized.

Where the ON and OFF timing are displaced, in which in the case of a two wheel drive, the motor drivers may displace the ON and OFF timings of the driving element of the inverter unit an angle of 180° relative to each other in terms of the PWM cycle. But in the case of a four wheel drive, the motor drivers may displace the ON and OFF timings of the driving element of the inverter unit an angle of 90° relative to each other in terms of the PWM cycle. Also, in the case of an eight wheel drive, the motor drivers may displace the ON and OFF timings of the driving element of the inverter unit an angle of 45° relative to each other in terms of the PWM cycle. As described above, in the case of the four wheel drive, if one cycle of the PWM control is divided by 4 and the center of the ON operation time of each of the driving devices is so controlled as to appear at intervals of 90°, a large electric current may not be instantaneously supplied from the battery during a low load time and the current can be smoothened. In a manner similar to that described above, if displacement of 180° or 45° in the case of the two wheel drive or the eight wheel drive, respectively, is made, no large electric current may be supplied instantaneously from the battery during the low load time and the electric current can be smoothened.

It is to be noted that the above described two, four and eight wheel drives may not be necessarily limited to the number of wheels being two, four and eight in the case of the vehicle, and particularly where the wheel used to drive can be selectively switched, the above described control may be made so as to attain the above described angle of displacement under a condition in which switching is made to the two wheel drive, four wheel drive or eight wheel drive.

Also, the booster unit may include a plurality of driving elements and a plurality of reactors for one booster control section. The booster unit may be driven to differentiate the operation start time and the operation halt time of the plurality of the driving elements from each other. When the booster unit has a plurality of reactors and the timings at which an electric current is applied to each of those reactors are displaced, the ripple current of the smoothing circuit can be reduced and the capacitor of the smoothing circuit can be downsized. With the reactor employed in a plural number, the reactor can also be downsized. By so doing, a still further reduction in size, weight and cost of the driving device of the in-wheel motor vehicle can be achieved.

Where the ON and OFF timings of the plurality of the driving elements of the booster unit are displaced, the booster control section of the booster unit may displace the ON and OFF timings so that center of the ON and OFF timing of each of the driving element becomes an equal interval by dividing the PWM cycle by the number of the driving elements. The start point of the ON and OFF timing, not the center of the ON and OFF timing, may be displaced. In other words, the booster control section of the booster unit may be displaced to allow the start of the ON and OFF timing of each of the driving element to become an equal interval by dividing the PWM cycle by the number of the driving elements.

Where the ON and OFF timings of the plurality of the driving elements of the booster unit are displaced, the booster control section of the booster unit may control so that the ON timings of all of the plurality of the driving elements will not overlap.

Where the inverter control unit and the booster control section of the booster unit are integrated together so that at least a part thereof may be shared among the plurality of the motor drivers, the booster control section of the booster unit may drive the driving elements according to the PWM scheme and may render the PWM cycle of the plurality of the driving elements to be variable. In this case, the booster control section of the booster unit may be so designed as to drive all of the plurality of the driving elements at the same cycle.

The booster control section of the booster unit may fix the proportion of ON and OFF of the PWM to render the PWM cycle to be variable. In this case, the booster control section of the booster unit may fix the proportion of ON of the PWM of the plurality of the driving elements to be an interval obtained by dividing the PWM cycle by the number of the plurality of the driving elements to thereby displace to avoid overlapping of the ON timing of each of the driving elements. Also, the booster control section of the booster unit may fix the proportion of OFF of the PWM of the plurality of the driving elements to be an interval obtained by dividing the PWM cycle by the number of the plurality of the driving elements to thereby displace to avoid overlapping of the ON timing of each of the driving elements.

The booster unit may have the interval of the operation start times of the plurality of the driving elements that is fixed. The booster unit may be designed to avoid overlapping of the operation times of the plurality of the driving elements. Even with those, the ripple current can be reduced.

In addition, where the booster unit has the plurality of the driving elements and the plurality of the rectors for one booster control section as hereinbefore described, the use may be made of a bypass path through which the electric current is supplied without passing through the reactors. In the booster unit, the boosting voltage is determined in dependence on the number of rotation of the in-wheel motor assembly. In other words, if the number of rotations is lower than a predetermined value, no boosting operation takes place. If the bypass path is provided in the booster unit, even when no boosting operation takes place, the electric current is supplied from the power source through the reactors, and, therefore, the loss resulting from the resistance of the reactor cannot be negligible. Accordingly, with the bypass path provided in the booster unit, the loss during the low speed operation can be reduced.

In the present invention, the vehicle referred to hereinbefore may be an electric-powered vehicle or a fuel cell-powered vehicle having ones of front left and right wheels and rear left and right wheels that are driven by the in-wheel motor assemblies. Also, the vehicle referred to hereinbefore may be an electric-powered vehicle or a fuel cell-powered vehicle having ones of front left and right wheels and rear left and right wheels that are driven by the in-wheel motor assemblies and also having the others of front left and right wheels and rear left and right wheels that are driven by an internal combustion engine. Yet, the vehicle referred to hereinbefore may be an electric-powered vehicle or a fuel cell-powered vehicle having both of front left and right wheels and rear left and right wheels that are driven by the in-wheel motor assemblies. Since the in-wheel motor vehicle according to the present invention is the one having mounted thereon the driving device for the in-wheel motor vehicle of the present invention, the size, weight and cost of the device for driving the in-wheel motors can be reduced.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 9A is a chart showing one example of ON timings of the motor drivers;

FIG. 9B is a chart showing another example of the ON timings of the motor drivers;

FIG. 9C is a chart showing a further example of the ON timings of the motor drivers;

FIG. 10 is a schematic diagram showing an example of the configuration construction of the component parts employed in the in-wheel motor vehicle in which the driving device designed in accordance with a second embodiment of the present invention is incorporated;

FIG. 19 shows chart (A) showing waveforms of still further different examples of timings of the ON operation of the booster unit, chart (B) showing waveforms of the rectifier current thereof and chart (C) showing waveforms of the capacitor ripple current thereof;

DESCRIPTION OF EMBODIMENTS

Figure 1:
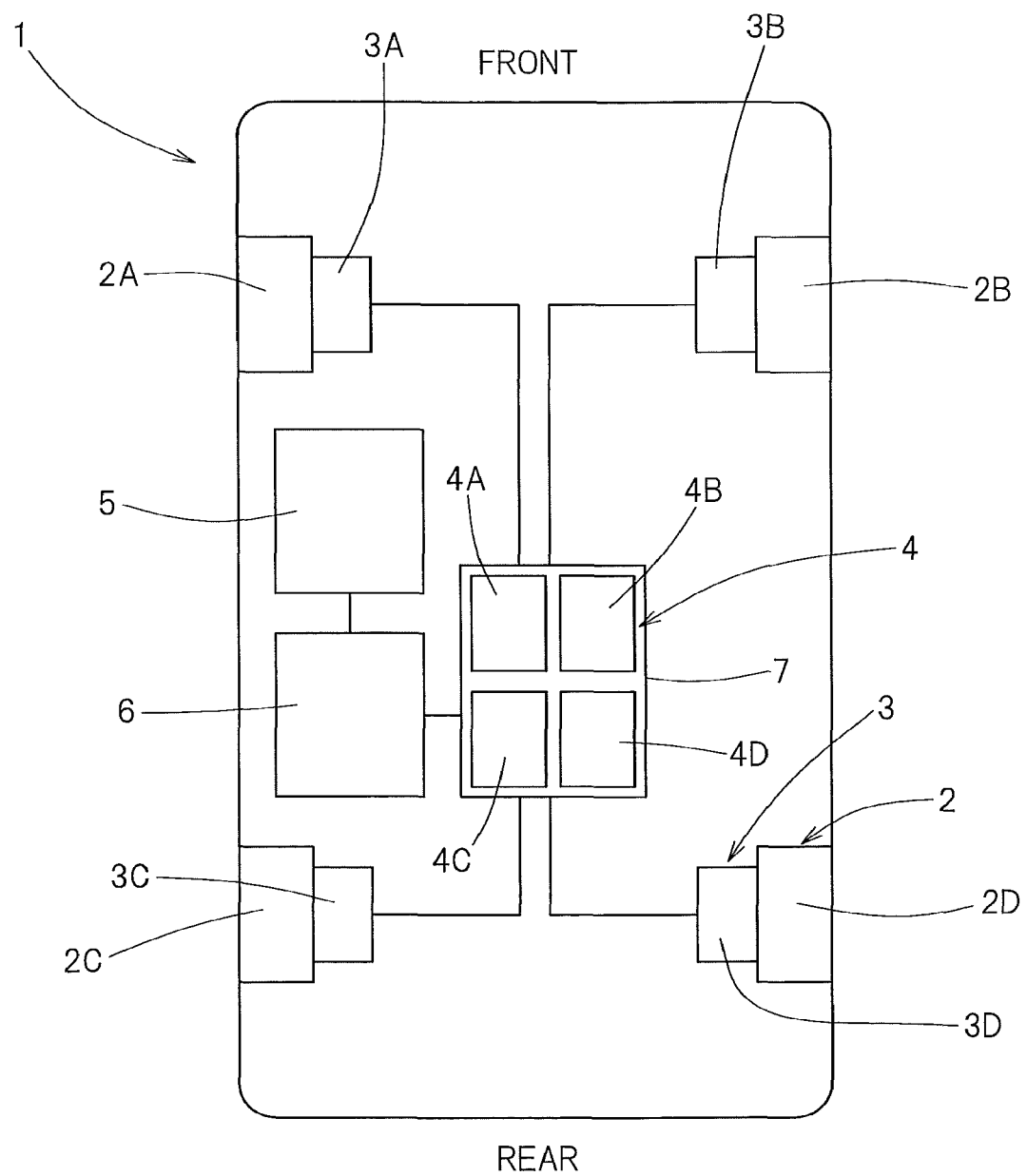
FIG. 1 is a schematic diagram showing an example of a configuration construction of component parts employed in an in-wheel motor vehicle in which a driving device designed in accordance with a first embodiment of the present invention is incorporated.

A first embodiment of the present invention will first be described with particular reference to FIGS. 1 to 7. FIG. 1 illustrates a schematic diagram showing a configuration construction of component parts employed in an in-wheel motor vehicle in which a driving device designed in accordance with this embodiment is incorporated. The illustrated in-wheel motor vehicle 1 is of a type having front left and right wheels 2A and 2B and rear left and right wheels 2C and 2D, each of which is designed as a drive wheel and has a corresponding in-wheel motor assembly 3A, 3B, 3C and 3D disposed therein, such that those drive wheels can be driven by the respective in-wheel motor assemblies 3A to 3D, and is in the form of, for example, an electric powered car or a fuel cell powered car. Each of the in-wheel motor assemblies 3A to 3D includes, for example, a motor, a speed reducer for reducing the number of rotations of such motor, and a wheel support bearing, a part or the entirety of which is accommodated within the corresponding wheel 2A to 2D. Four motor drivers 4A, 4B, 4C and 4D are provided in association with the respective in-wheel motor assemblies 3A to 3D, and by those motor drivers 4A to 4D respective rotation controls of the associated in-wheel motor assemblies 3A to 3D are carried out. The supply of an electric power to the motor drivers 4A to 4D takes place from a battery 5 through a battery control unit 6.

It is to be noted that in the reference numerals 2A to 2D, 3A to 3D and 4A to 4D, alphabetic characters "A", "B", "C" and "D" affixed to the numerical characters will be omitted unless distinction of elements referred to by those reference numerals is specifically required. Similarly, alphabetic characters "A", "B", "C" and "D" used in reference numerals employed hereinafter will be omitted unless distinction of elements, which are referred to by the respective reference numerals each bearing the alphabetic character "A", "B", "C" and "D", is specifically required.

Figure 2:
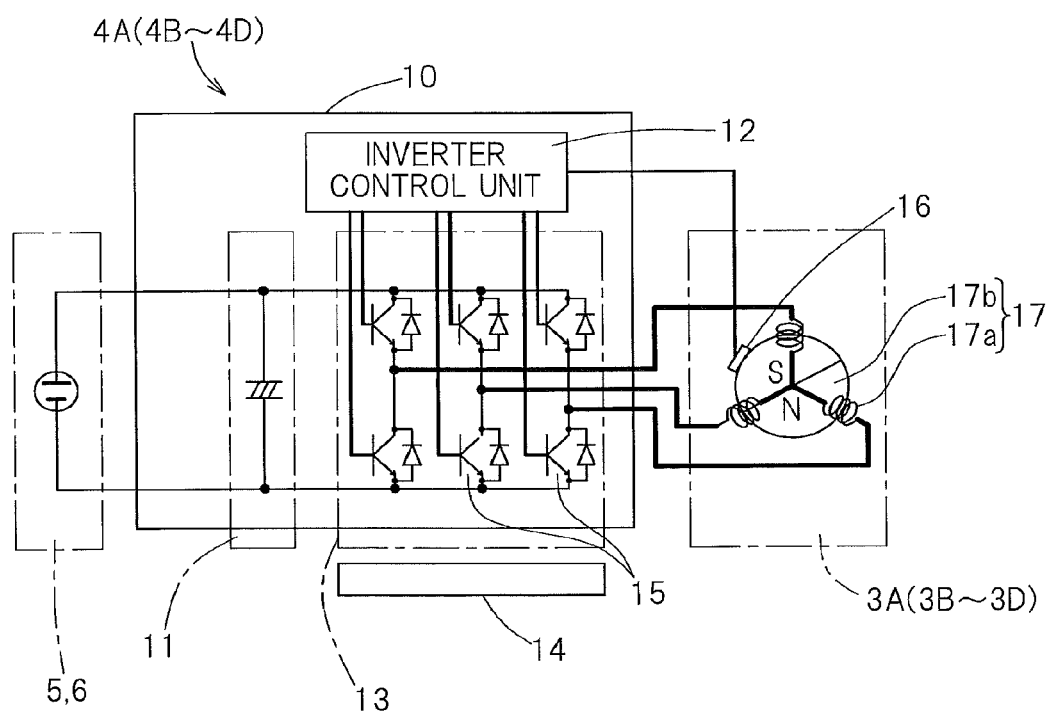
FIG. 2 is a schematic diagram showing an exemplary circuit layout in a motor driver in the driving device.

The four motor drivers 4A to 4D are put together at one location and then accommodated within a single common casing 7. FIG. 2 illustrates a schematic diagram showing a circuit construction of the motor drivers 4A to 4D. It is to be noted that in FIG. 2, the battery 5 and the battery control unit 6 are shown in the form of a single block as a battery unit for the sake of brevity. A motor 17 employed in each of the in-wheel motor assemblies 3A to 3D is a synchronous electric motor comprised of a stator 17a, having, for example, a three phase coil of UVW, and a rotor 17b in the form of a permanent magnet. Each of the motor drivers 4A to 4D includes a main body 10, having a smoothing circuit 11, an inverter control unit 12 and an inverter unit 13, and a cooler 14 for cooling the inverter unit 13. In the instance as shown, the cooler 14 is employed in the form of a water cooling type, and a pump for circulating a coolant and a cooling equipment for cooling the coolant, both not shown, are disposed outside of the casing 7. A direct current power supplied from the battery unit is smoothed by the smoothing circuit 11 and then inputted to the inverter units 13.

In the motor driver 4A to 4D, in order to control a large electric current at the time of drive of the in-wheel motor assemblies 3A to 3D, the smoothing circuit 11 comprised of a capacitor is necessitated in an input stage. The inverter unit 13 includes a plurality of driving elements 15 such as, for example, switching transistors and is operable to convert the direct current power, which is inputted thereto through the smoothing circuit 11, into a three phase alternating current power through an intermittent control of the driving elements 15, performed by the inverter control unit 12, and then to supply it to the in-wheel motor assemblies 3A to 3D. In the inverter control unit 12, based on the rotational phase of the motor rotor 17 detected by a phase detector 16 in the in-wheel motor assembly 3A to 3D, the timing of the intermittent control of the driving element 15 of the inverter unit 13 is determined. Also, each of the inverter control unit 12 has a function of communicating with other motor drivers 4A to 4D and with a host controller mounted on the vehicle for controlling and exercising various electric components and equipment of the vehicle.

Figure 3:
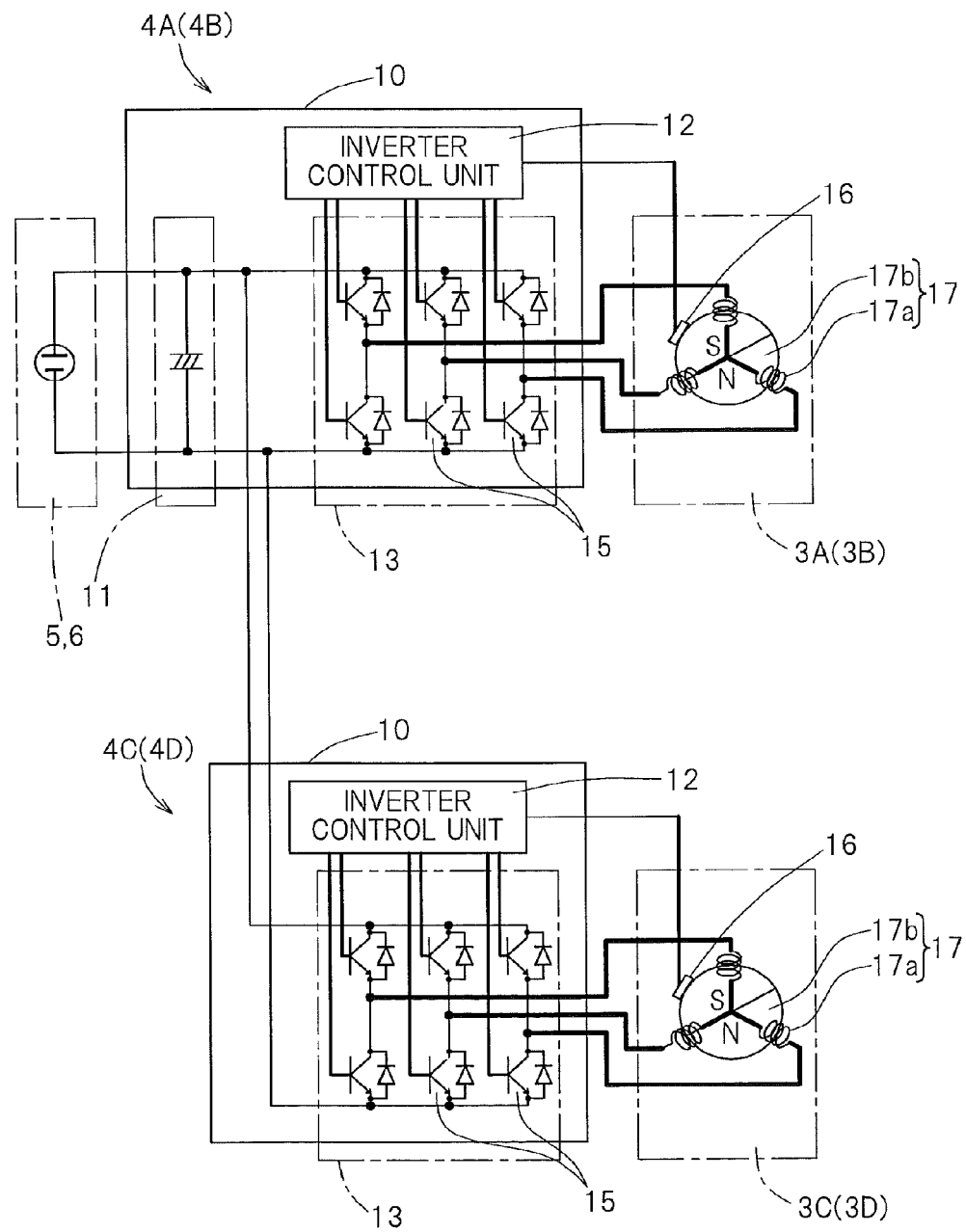
FIG. 3 is a schematic diagram showing another exemplary circuit layout in the motor driver in the driving device.

Although in FIG. 2 a different capacitor is employed in an input side of the main body 10 of each of the motor drivers 4A to 4D to form the respective smoothing circuit 11, with a capacitor provided in an input side of the motor driver 4A to 4D a single smoothing circuit 11 may be provided, which is shared by the motor drivers 4A to 4D as shown in FIG. 3.

Figure 4:
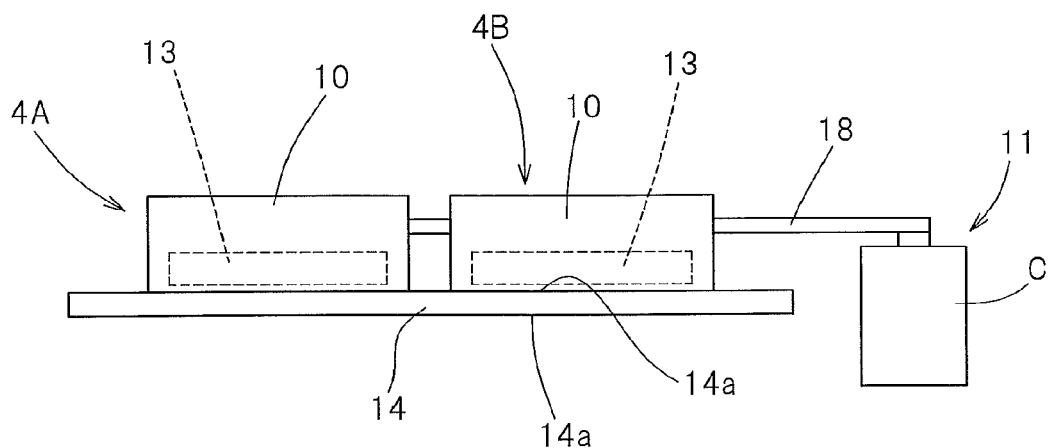
FIG. 4 is a schematic front elevational view showing one exemplary placement of a plurality of motor driver main body and a cooler within the common casing in the driving device.

FIG. 4 illustrates a schematic front elevational view showing one example of the configuration construction of the main body 10 and the cooler 14 of each of the motor drivers 4A to 4D within the casing 7. The cooler 14 is of a plate shape or a thin box-like shape and has its opposite back-to-back surfaces serving as respective cooling surfaces 14a. In this example of the configuration construction, all of the main bodies 10 of the motor drivers 4A to 4D are disposed on one side of the single cooler 14 with the respective inverter units 13 held at positions close to the cooling surface, so that the single cooler 14 may be shared by the motor drivers 4A to 4D. Each of the main bodies 10 of the motor drivers 4A to 4D and the capacitor C forming the smoothing circuit 11 are connected with each other through a copper bar 18.

Figure 5:
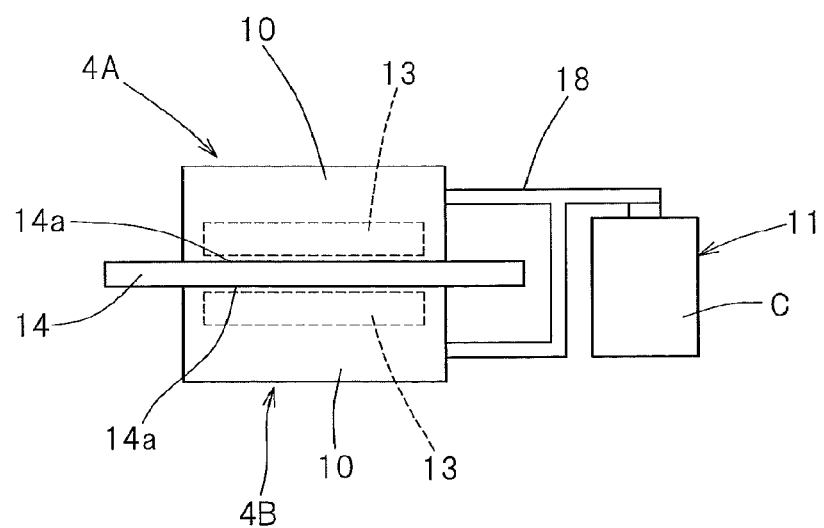
FIG. 5 is a schematic front elevational view showing another exemplary placement of a plurality of motor driver main body and a cooler within the common casing in the driving device.

Although in FIG. 4 all of the main bodies 10 of the motor drivers 4A to 4D have been shown as disposed on one side of the cooler 14, two of the main bodies 10 of the respective motor drivers 4A to 4D may be disposed on each side of the single cooler 14 so that two of the inverter units 13 held in the vicinity of each of the opposite cooling surfaces of such cooler 14 as shown in FIG. 5.

Figure 26:
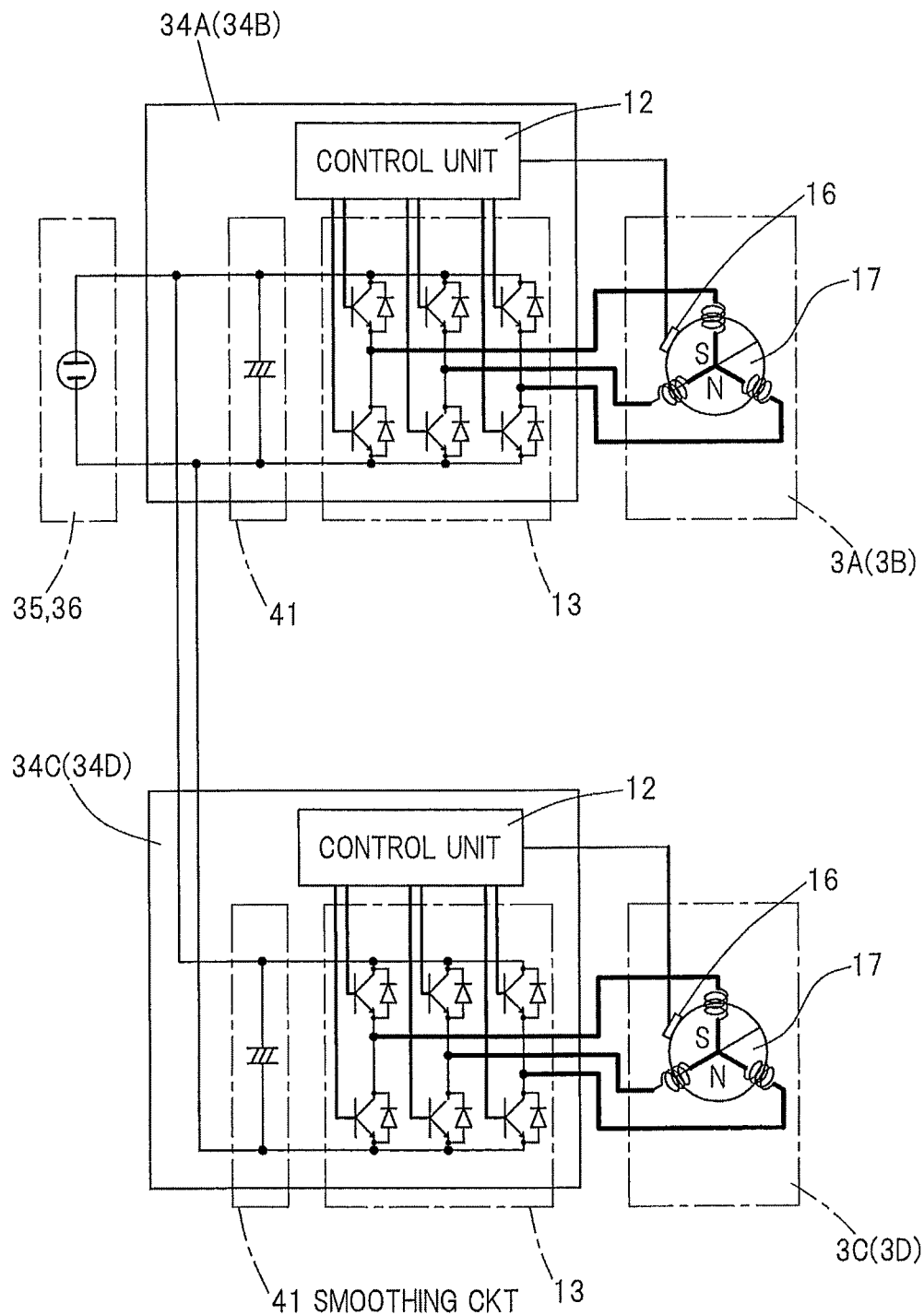
FIG. 26 is a schematic diagram showing the standard circuit construction of the motor driver.
Figure 29:
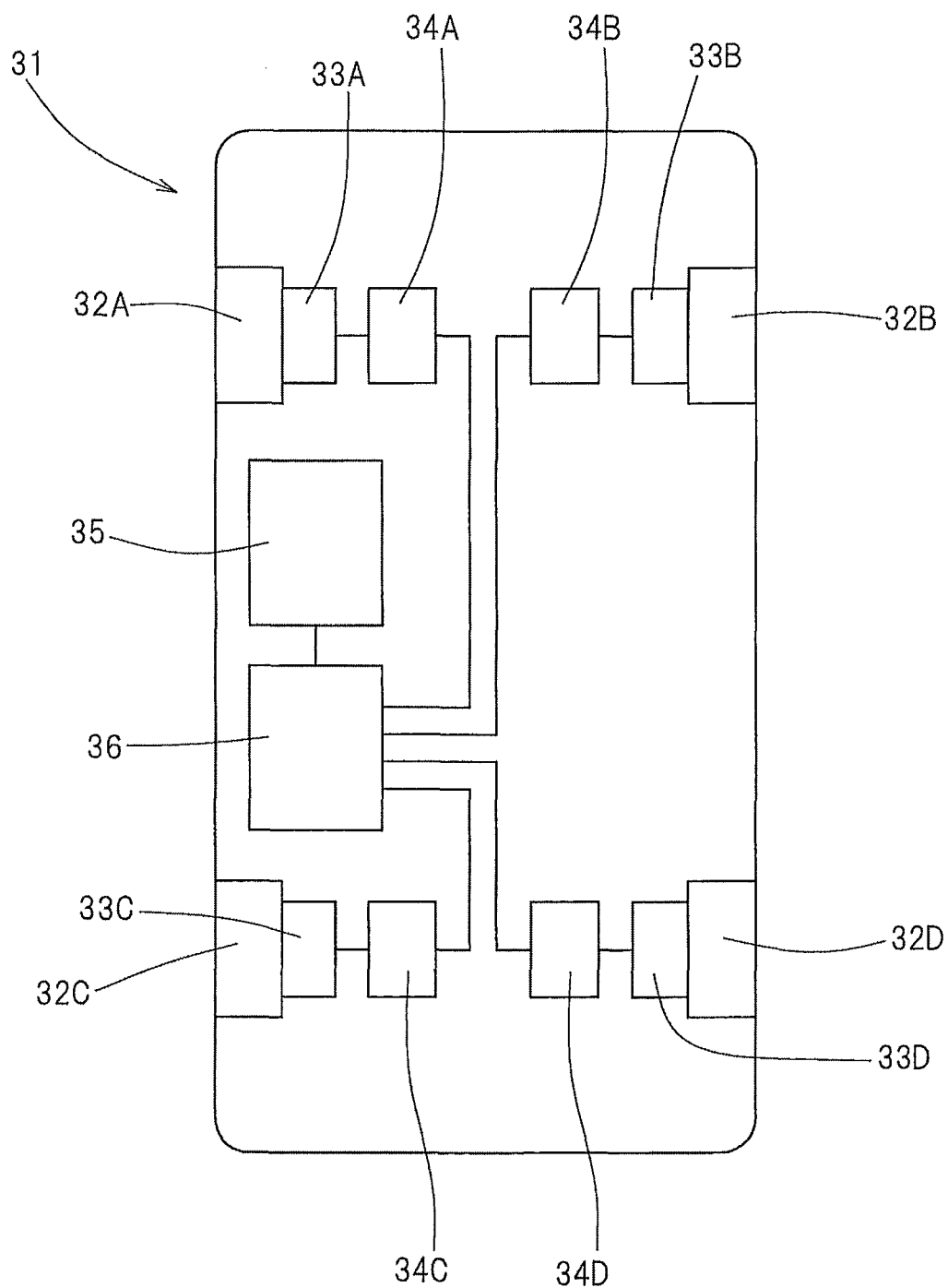
FIG. 29 is a schematic diagram showing the configuration construction of component parts in an in-wheel motor vehicle having the conventional driving device mounted thereon.

It is to be noted that the driving device employed in the conventional in-wheel motor vehicle the motor drivers 34A to 34D associated respectively with the in-wheel motor assemblies 33A to 33D are separately disposed at respective position close thereto or within the adjacent vehicle one for each in-wheel motor assembly 33A to 33D as shown in and discussed with reference to FIG. 29 and the smoothing circuit 41 is therefore employed for each of the motor driver 34A to 34D as shown in FIG. 26.

In contrast thereto, in the driving device for the in-wheel motor vehicle 1 according to the embodiment now under discussion, all of the motor drivers 4A to 4D are put together at one location and disposed within the common casing 7 and, therefore, it becomes possible for a single smoothing circuit 11 to be concurrently used for all of the motor drivers 4A to 4D. Also, since as exemplified by the example of the configuration constructions shown respectively in FIGS. 4 and 5 it become possible to mount the main bodies 10 of all of the motor drivers 4A to 4D on a single cooler 14, the inverter units 13 of the motor drivers 4A to 4D can be cooled with the concurrent utilization of the single cooler 14 for all of such inverter units 13. As shown in FIG. 5, where the main bodies 10 of the respective motor drivers 4A to 4D are disposed in divided groups on the opposite sides of the cooler 14, downsizing of the cooler 14 becomes easy and the cooling efficiency of the cooler 14 can be increased. As a result, reduction in size, weight and cost of the driving device becomes possible.

Figure 6:
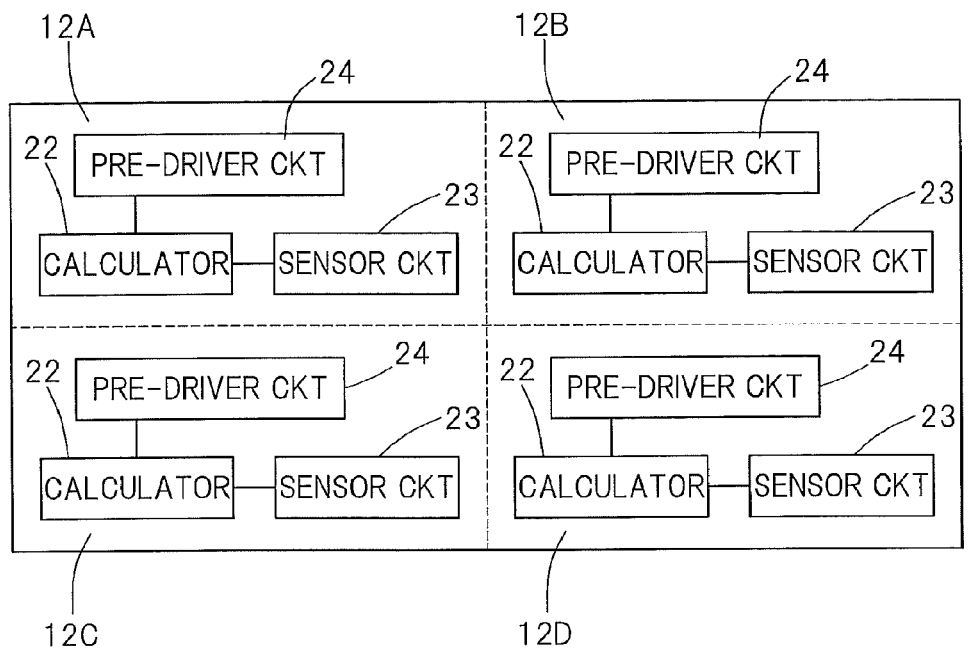
FIG. 6 is a block diagram showing an example of arrangement, in which control sections of the plurality of the motor drivers are integrated together.

FIG. 6 illustrates an example of a circuit block diagram, in which the inverter control units 12A to 12D of each of the motor drivers 4A to 4D are integrated together in the example of the configuration construction shown in FIG. 4, in which the main body 10 of each of the motor drivers 4A to 4D is disposed on one side of the cooler 14. Each of the inverter control units 12A to 12D is comprised of, for example, a microcomputer and electronic circuits. Each of the inverter control units 12A to 12D includes a first calculator 22, a sensor circuit 23 and a pre-driver circuit 24 for a driving element. The calculator 22 deals with, for example, a function of determining ON and OFF timings of the driving element 15 in the inverter unit 13 to thereby control the number of rotation or motor torque in the corresponding in-wheel motor assembly 3A to 3D, a fail-safe function, a communicating function and a temperature monitoring function or the like. The sensor circuit 23 is operable to calculate the angle of rotation from a signal of the phase detector 16 in the form of such as, for example, a resolver fitted to the corresponding in-wheel motor assembly 3A to 3D. The pre-driver circuit 24 for the driving element is operable to control ON and OFF of the driving element 15 in the inverter unit 13 in dependence on a command from the calculator 22.

The inverter control unit 12A to 12D in each of the motor drivers 4A to 4D of the inverter control unit 12 has a function of communicating with other motor drivers 4A to 4D and with a host controller mounted on the vehicle for controlling and exercising various electric components and equipment of the vehicle, as hereinbefore described. When the inverter control units 12A to 12D of each of the motor drivers 4A to 4D are integrated together as shown in FIG. 6, communication cables, harnesses and connectors among the motor drivers 4A to 4D and between the host controller and them can be communized and, therefore, reduction in size and cost of the driving device can be achieved.

Figure 7:
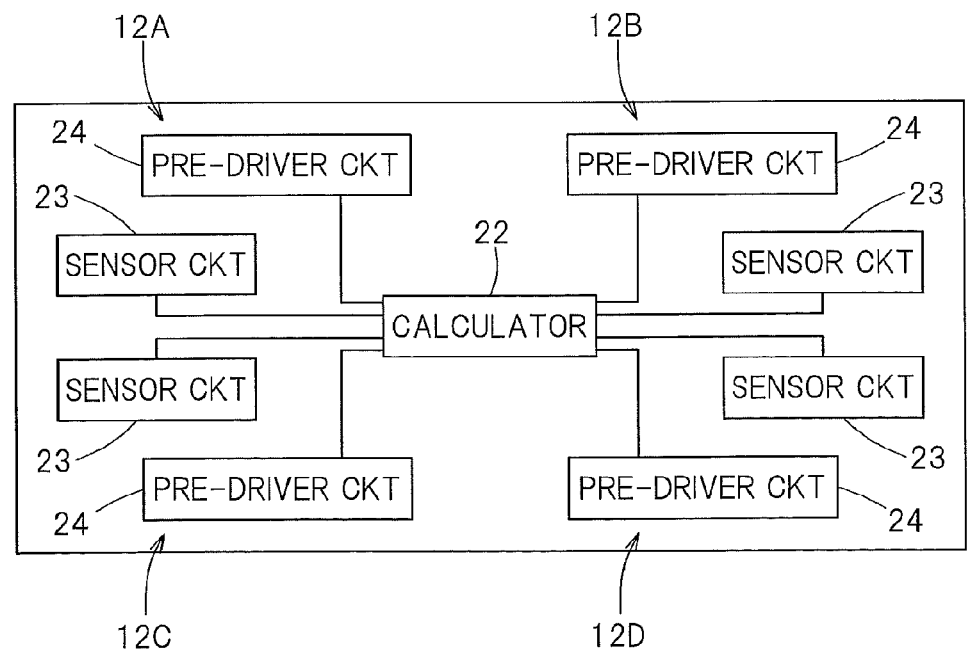
FIG. 7 is a block diagram showing an example of arrangement, in which calculating units of the control sections of the plurality of the motor drivers are shared together.

FIG. 7 illustrates a circuit block diagram showing an example in which in the construction of FIG. 6, in which the inverter control units 12A to 12D of each of the motor drivers 4A to 4D are integrated together, the calculator 22 of each of the inverter control units 12A to 12D are commoditized, that is, a single calculator 22 is employed and commonly shared by the inverter control units 12A to 12D. When as described above the calculators 22 of the respective inverter control units 12A to 12D are shared, i.e., are commonly shared with one calculator, information concerning the in-wheel motor assemblies 3A to 3D and respective statuses (for example, number of rotations, current value, temperature and others) of the motor drivers 4A to 4D can be commonly shared simply with no communication used.

Where the calculators 22 employed respectively in the inverter control units 12A to 12D are integrated into the single calculator 22 to be commonly shared as shown in FIG. 7, the inverter control units 12A to 12D of the plurality of the motor drivers 4A to 4D are such that as a control system for driving the driving elements 15 of the inverter units 13 according to the PWM scheme, the plurality of the motor drivers 4A to 4D are preferably of a type in which cycles of the PWM are equal to each other and the ON and OFF timings of the driving elements 15 are displaced relative to each other. For example, the center of the ON timing of the driving elements 15 of the inverter units 13 of each of the motor drivers 4A to 4D may be displaced so that the intervals of the centers may become equal to each other by dividing the PWM cycles by the number of the motor drivers 4A to 4D. In place of the center of the ON timing, the start point of the ON timing may be displaced so that the intervals of the start points may become equal to each other by dividing the PWM cycles by the number of the motor drivers 4A to 4D.

More specifically, in the case of a two wheel drive, the ON and OFF timings of the driving element 15 of the inverter unit 13 of the motor drivers 4A to 4D may be displaced 180° from each other relative to the PWM cycle. In the case of a four wheel drive, the motor drivers 4A to 4D may displace the ON and OFF timings of the driving element 15 of the inverter control unit 12A to 12D by 90° from each other relative to the PWM cycle. In the case of an eight wheel drive, the motor drivers 4A to 4D may displace the ON and OFF timings of the driving element 15 of the inverter units 13 by 45° from each other relative to the PWM cycle.

Figure 8:
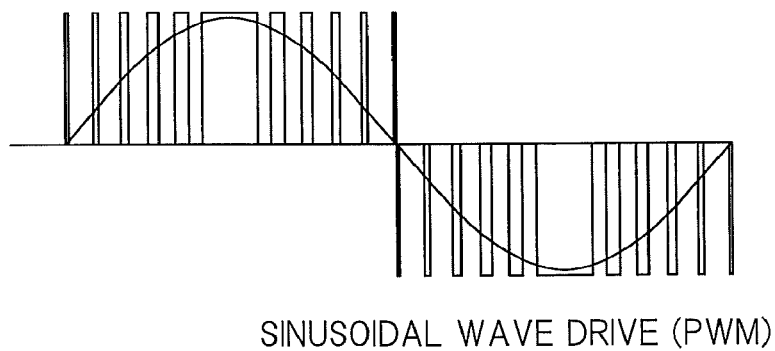
FIG. 8 is a chart showing a voltage-current waveform during the drive of a motor of the motor driver.

The voltage-current waveform during the motor driving is shown in FIG. 8. The inverter control units 12, 12A to 12D shown in and described with reference to FIGS. 2, 3, 6 and 7 are such that through the PWM control the driving element 15 of the inverter unit 13 is selectively switched on or off so that an electric current of a sinusoidal waveform may be supplied to a coil of the stator 17a in the motor 17 of the in-wheel motor assembly 3A to 3D.

FIGS. 9A to 9C illustrate the ON timings of the driving element 15 of the motor driver 4A and that of the motor driver 4B. FIG. 9A illustrates the determination of the timings that is made to establish equal intervals with respect to the center of each ON operation times of the motor driver 4A and the motor driver 4B that is taken as reference. On the other hand, FIG. 9B illustrates the determination of the timings that is made to establish equal intervals with respect to the start point of each of the ON operations. When as shown in FIG. 7 the calculator 22 is shared, the driving element ON timings of the plurality of the motor drivers 4A to 4D can be easily controlled, and, therefore, the timings can be displaced as such. Also, when the timings of the motor driver 4A and the motor driver 4B are equidistantly displaced as shown in FIGS. 9A and 9B, the peak value of a ripple current from the shared smoothing capacitor C can be reduced, making it possible to downsize the smoothing capacitor.

FIG. 9C illustrates the installation of the four motor drivers 4A to 4D so that in the case of, for example, a four wheel drive, the four in-wheel motor assemblies 3A to 3D can be independently driven. In this example, one cycle of the PWM control is divided into four parts so that control can be made to bring the center of the ON operation times of those driving devices at intervals of 90°. For this reason, there is no need to supply a large current instantaneously from the battery during a low load time and the electric current can be smoothened. Although this is not limited to the four wheel drive, the timing is determined depending on the number of the drive motors.

Figure 11:
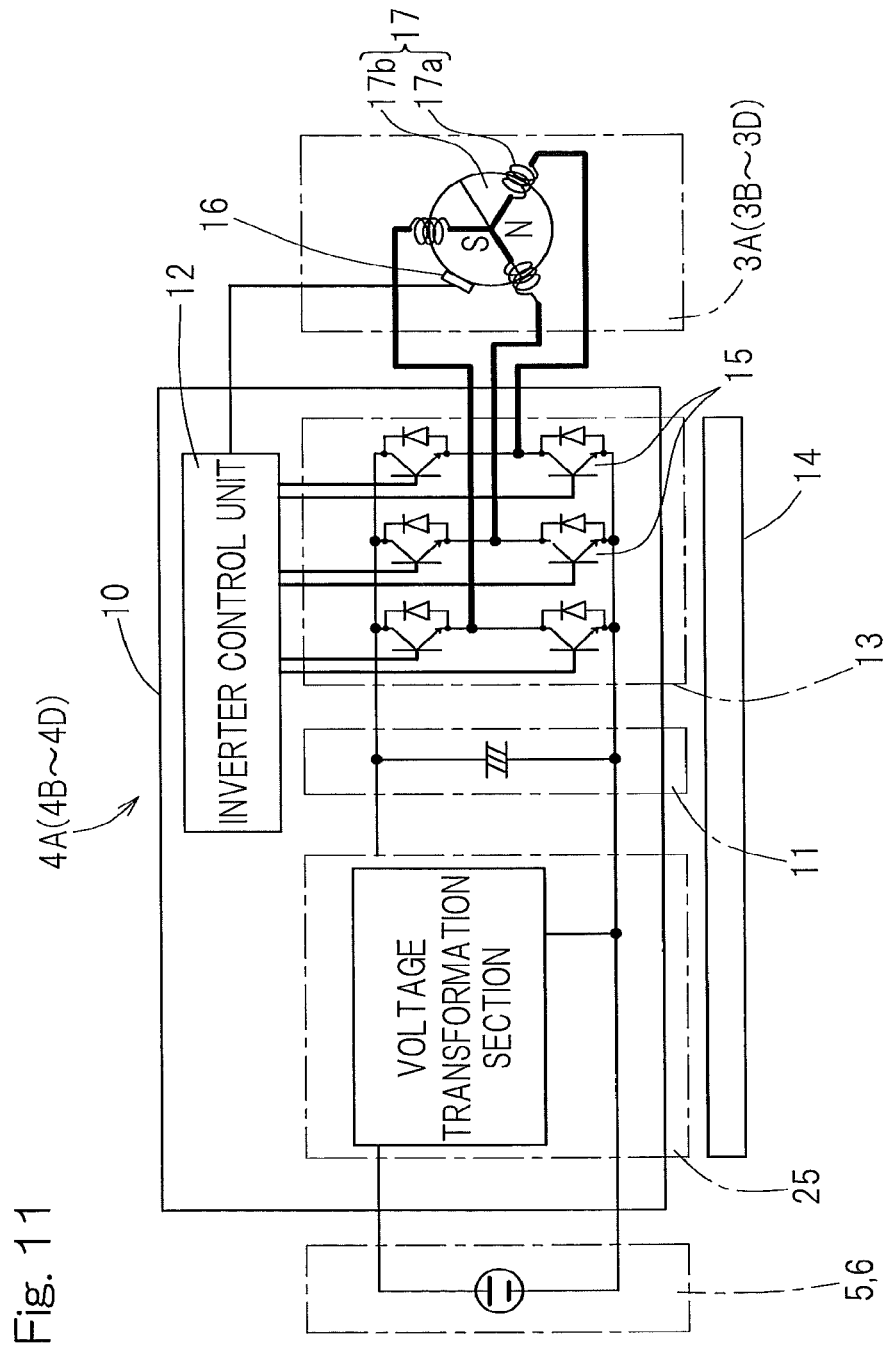
FIG. 11 is a schematic block circuit diagram showing a boosting circuit added to the motor driver in the driving device.
Figure 12:
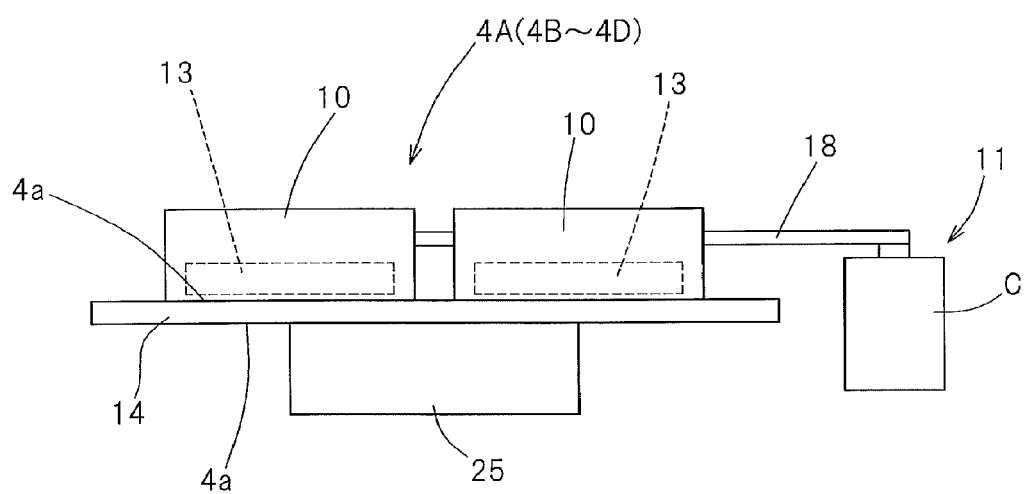
FIG. 12 is a schematic front elevational view showing one example of arrangement of the motor driver main bodies, the cooler and the boosting circuit within the common casing in the driving device.

FIGS. 10 to 12 illustrate a second embodiment of the present invention. For the in-wheel motor drive, the use may be made of a booster circuit for the purpose of increasing the efficiency to increase the power source voltage. In this second embodiment which will now be described, in the driving device for the in-wheel motor vehicle such as shown in and described with particular reference to FIG. 1, in addition to the four motor drivers 4A to 4D a booster unit 25 is disposed within the single common casing 7 as is the case with the example of the configuration construction of component parts as schematically shown in FIG. 10. FIG. 11 illustrates a schematic diagram showing the circuit construction with the booster unit 25 added to the motor drivers 4A to 4D. In this case, the smoothing circuit 11 in the motor driver main body 10 is disposed on an output side of the booster unit 25. As shown in a schematic diagram showing a circuit construction thereof in FIG. 14, this booster unit 25 is comprised of a plurality of (for example, four in this instance) booster circuits each comprised of a driving element 27, a reactor 28 and a rectifier 29, which are connected parallel to each other, and a single booster control section 26 for performing the ON and OFF controls of those booster circuits to thereby increase the power source voltage that is supplied from the battery unit.

Figure 14:
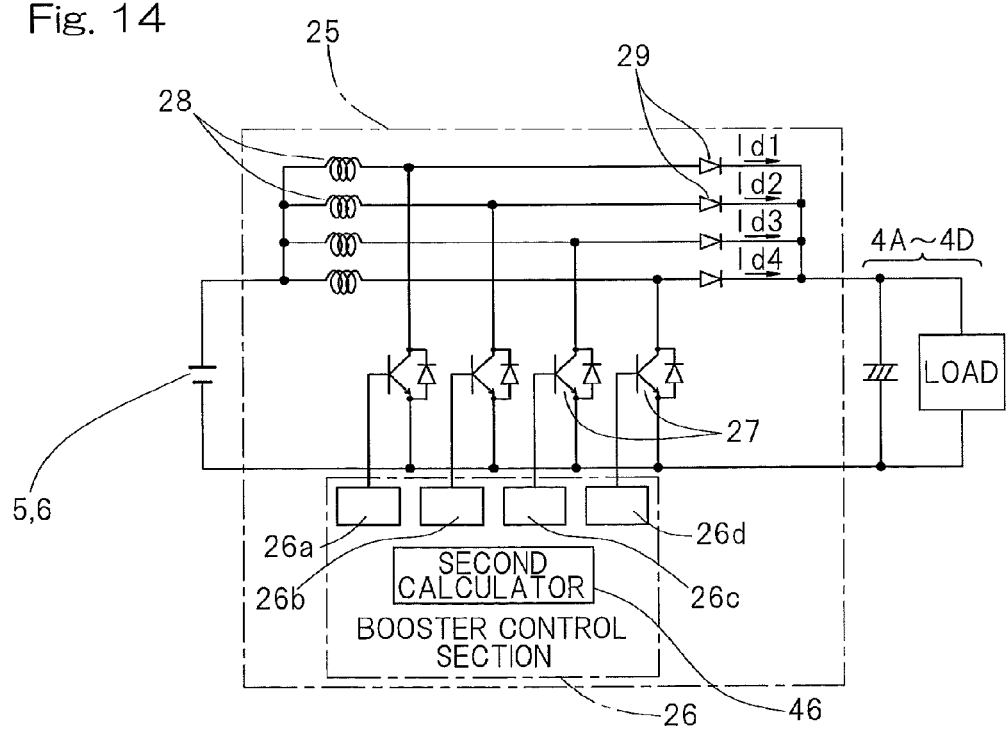
FIG. 14 is a schematic diagram showing one example of the circuit layout of the booster unit in the driving device.

It is to be noted that in FIG. 14, for the sake of brevity, the battery unit (the battery 5 and the battery controller unit 6) shown in FIG. 11 is shown as represented by the symbol of a direct current power source and the motor drivers 4A to 4D and each of the in-wheel motor assemblies 3A to 3D are shown as represented by a capacitor and a load. Other structural features are similar to those shown in and described with reference to FIG. 1 in connection with the first embodiment.

FIG. 12 illustrates a front elevational view showing an example of the configuration construction of the main body 10 of each of the motor drivers 4A to 4D, the cooler 14 and the booster unit 25 all within the common casing 7. In this example of the configuration construction, all of the main bodies 10 of the motor drivers 4A to 4D are disposed on one side of the cooler 14 so that the inverter units 13 thereof may be positioned in the vicinity of the cooling surface of the single cooler 14, which is commonly utilized by each of the motor drivers 4A to 4D, and the booster unit 25 is disposed on the cooling surface on the other side of the cooler 14 that is opposite to the surface side on which the motor driver main body is installed.

Other than those, if a to-be-cooled portion of the main body 10 of each of the motor drivers 4A to 4D (mainly, the inverter unit 13) can be efficiently arranged on the cooling surface of the cooler 14, some of the main bodies 10 of each of the motor drivers 4A to 4D may be disposed on the cooling surface on the other side of the cooler 14 on which the booster unit 25 is disposed.

Figure 13:
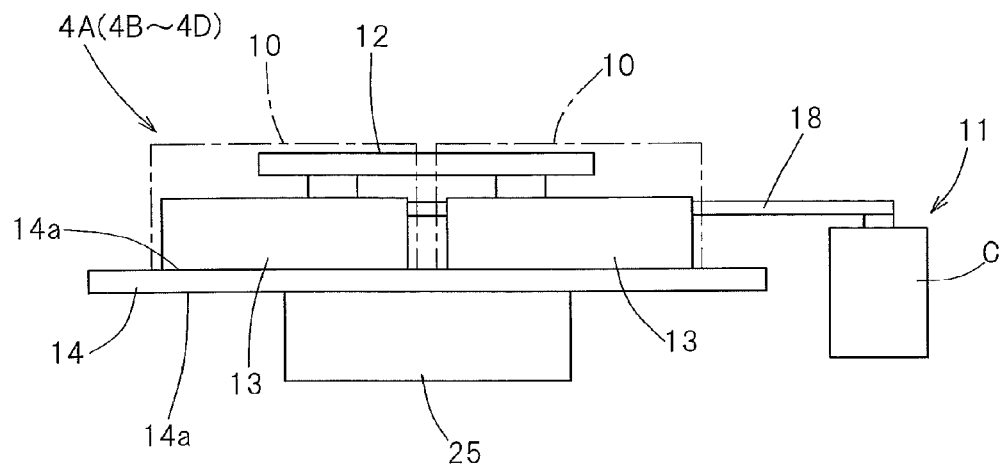
FIG. 13 is a schematic front elevational view showing one example, in which the control sections of the motor drivers in the driving device are integrated together.

FIG. 13 illustrates a front elevational view showing a front elevational view showing an example, in which in the example of the configuration construction shown in FIG. 12, in which all of the main bodies 10 of each of the motor drivers 4A to 4D are disposed on one side of the single cooler 14, the inverter control units 12A to 12D of the motor drivers 4A to 4D are integrated together. Even in this case, as shown in FIG. 7 in connection with the previously described embodiment, the calculator 22 of each of the inverter control units 12A to 12D may be shared. Also, the booster control section 26 (shown in FIG. 14) of the boosting unit 25 may be integrated with the inverter control unit 12 of each of the motor drivers 4A to 4D. In addition, a second calculator 46, provided in the booster control section 26, and the calculator 22 of the inverter control unit 12 of each of the motor drivers 4A to 4D may be shared by a single calculating unit.

In the example of the circuit construction of the boosting unit 25 shown in FIG. 14, the four booster circuits have been shown and described as of a type having four circuits connected parallel to each other, but the booster circuit may have two or more circuits. As described above, by forming the boosting unit 25 is comprised of a plurality of booster circuits, which are connected in parallel to each other, and a single booster control section 26 for performing the ON and OFF control of a plurality of driving elements 27 forming each of the booster circuits, the ON and OFF timing signals from output segments 26a to 26d corresponding to each of the driving elements 27 in the booster control section 26 can be displaced relative to each other as shown in chart (A) of FIG. 15 and, hence, the ripple current flowing towards the capacitors forming the smoothing circuits 11 on the input side of the motor drivers 4A to 4D can be reduced as shown in chart (C) of FIG. 15. Since the ripple current can be reduced as hereinabove discussed, the size of the capacitor forming the smoothing circuit 11 can be reduced. Also, the use of a plurality of reactors 28 makes it possible to downsize the reactors 28. As a result, the reduction in size and cost of the driving device can be accomplished.

Figure 27:
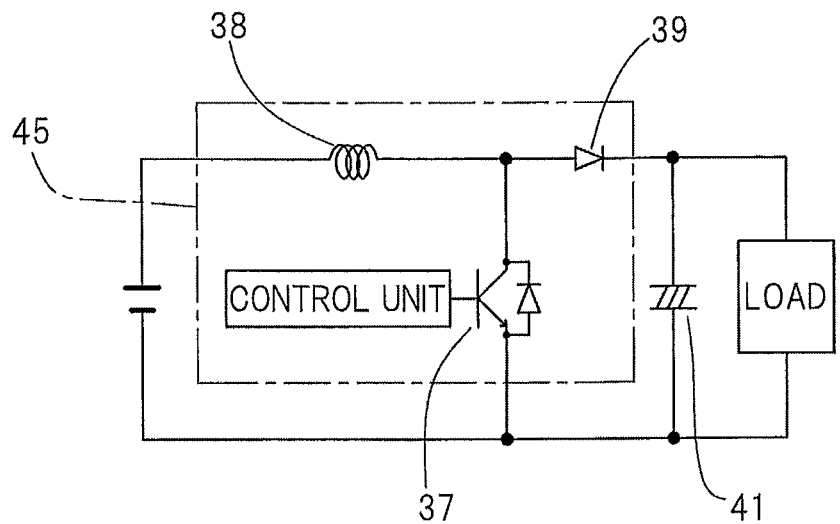
FIG. 27 is a schematic diagram showing the standard circuit construction of the booster unit.
Figure 28:
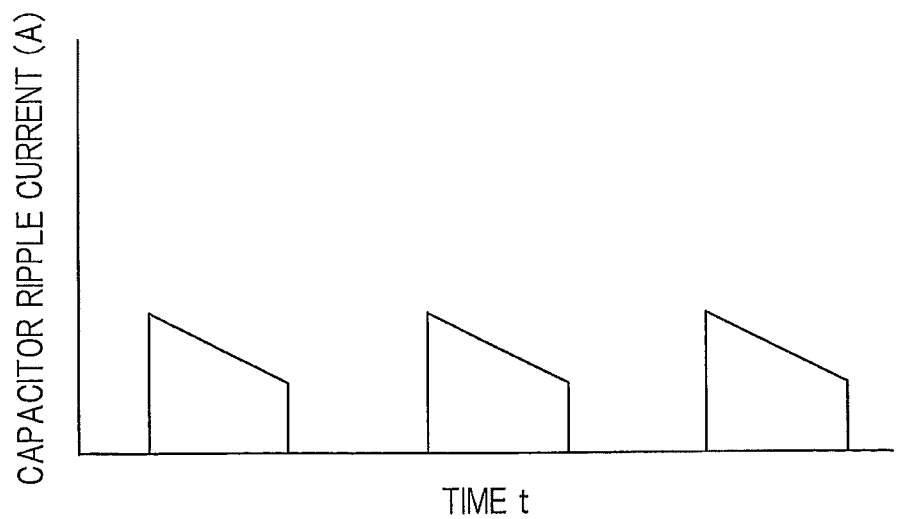
FIG. 28 is a chart showing waveforms of the capacitor ripple current in the booster unit.

For the purpose of comparison with the previously described boosting unit 25 employed in the practice of this embodiment, a circuit construction of a generally employed, conventional booster unit is shown in FIG. 27. In the conventional booster unit 45, one boosting circuit is formed with one driving element 37, one reactor 38 and one rectifier 39. In this circuit construction, at the ON and OFF timings, an electric current flowing through the driving element 37 and an electric current flowing through the rectifier 39 are switched over to each other and, therefore, the electric current flowing through a capacitor forming a smoothing circuit 41 on an input side of the motor driver represents such an intermittent current waveform as shown in FIG. 28.

In this embodiment, the first calculator 22 of the inverter control unit 12 and the second calculator 46 of the booster control section 26 are integrated together as hereinabove described. The booster control section 26 of the booster unit 25 drives the plurality of the driving elements 27 according to the PWM scheme, makes the PWM cycles of those driving elements 27 equal to each other and displaces the ON and OFF timings of those driving elements 27. Where the calculators are integrated together as discussed above, it is also possible to reduce the ripple current supplied to the smoothing circuit by displacing the ON and OFF timings of the plurality of the driving elements of the booster unit.

Where the ON and OFF timings of the plurality of the driving elements 27 of the booster unit 25 are displaced, the booster control section 26 of the booster unit 25 may displace the centers of the ON and OFF timings of the driving elements 27 so that the centers of the ON and OFF timings of the driving elements 27 have equal intervals by dividing the PWM cycles by the number of the driving elements 27. In place of the center of the ON and OFF timings, the start point of the ON and OFF timings may be displaced. In other words, the booster control section 26 of the booster unit 25 may displace the start points of the ON and OFF timings of the driving elements 27 so that the start points of the ON and OFF timings of the driving elements 27 have equal intervals by dividing the PWM cycles by the number of the driving elements 27.

Where the ON and OFF timings of the plurality of the driving elements 27 of the booster unit 25 are displaced, the booster control section 26 of the booster unit 25 may be so designed as to control so that all of the ON timings of the plurality of the driving elements 27 will not overlap with each other.

Where the inverter control unit 12 and the booster control section 26 of the booster unit 25 are integrated together to be at least partially shared by the plurality of the motor drivers 4A to 4D, the booster control section 26 of the booster unit 25 may drive the driving element 27 under the PWM scheme and the cycles of the PWM of the plurality of the driving elements 27 may be made variable. In such case, the booster control section 26 of the booster unit 25 may be designed to drive all of the plurality of the driving elements 27 at the same cycle.

The booster control section 26 of the booster unit 25 may be such that the PWM cycle is variable with the proportion of ON and OFF timings of the PWM being fixed. In such case, the booster control section 26 of the booster unit 25 may be operable to settle the proportion of ON timing of PWM of the plurality of the driving elements 27 to an interval obtained by dividing the PWM cycle by the number of the plurality of the driving elements 27 to thereby displace the ON timings so that the ON timings of each of the driving elements 27 will not overlap. Also, the booster control section 26 of the booster unit 25 may be operable to settle the proportion of OFF timing of PWM of the plurality of the driving elements 27 to an interval obtained by dividing the PWM cycle by the number of the plurality of the driving elements 27 to thereby displace the OFF timings so that the OFF timings of each of the driving elements 27 will not overlap.

Also, the booster unit 25 may have a plurality of the driving elements 27 and a plurality of the reactors 28 for each of the booster control sections 26. The booster unit 25 referred to above may allow the plurality of the driving elements 27 to drive so that the operation start time and the operation stop time of the plurality of the driving elements 27 are different from each other. When the booster unit 25 has the plurality of the reactors 28 and the timing at which the electric current is applied to each of the rectors 28 is displaced, the ripple current of the smoothing circuit can be reduced and the capacitor of the smoothing circuit can be downsized. When the reactor 28 is employed in a plural number, the reactor 28 can also be downsized. Accordingly, it is possible to further reduce the size, the weight and the cost of the driving device for the in-wheel motor vehicle.

The booster unit 25 may be such as to render the interval of the operation start time of the plurality of the driving elements 27 to be constant. The booster unit 25 may be such as to avoid overlapping of the operation time of the plurality of the driving elements 27. By so doing, the ripple current can be reduced.

Figure 16:
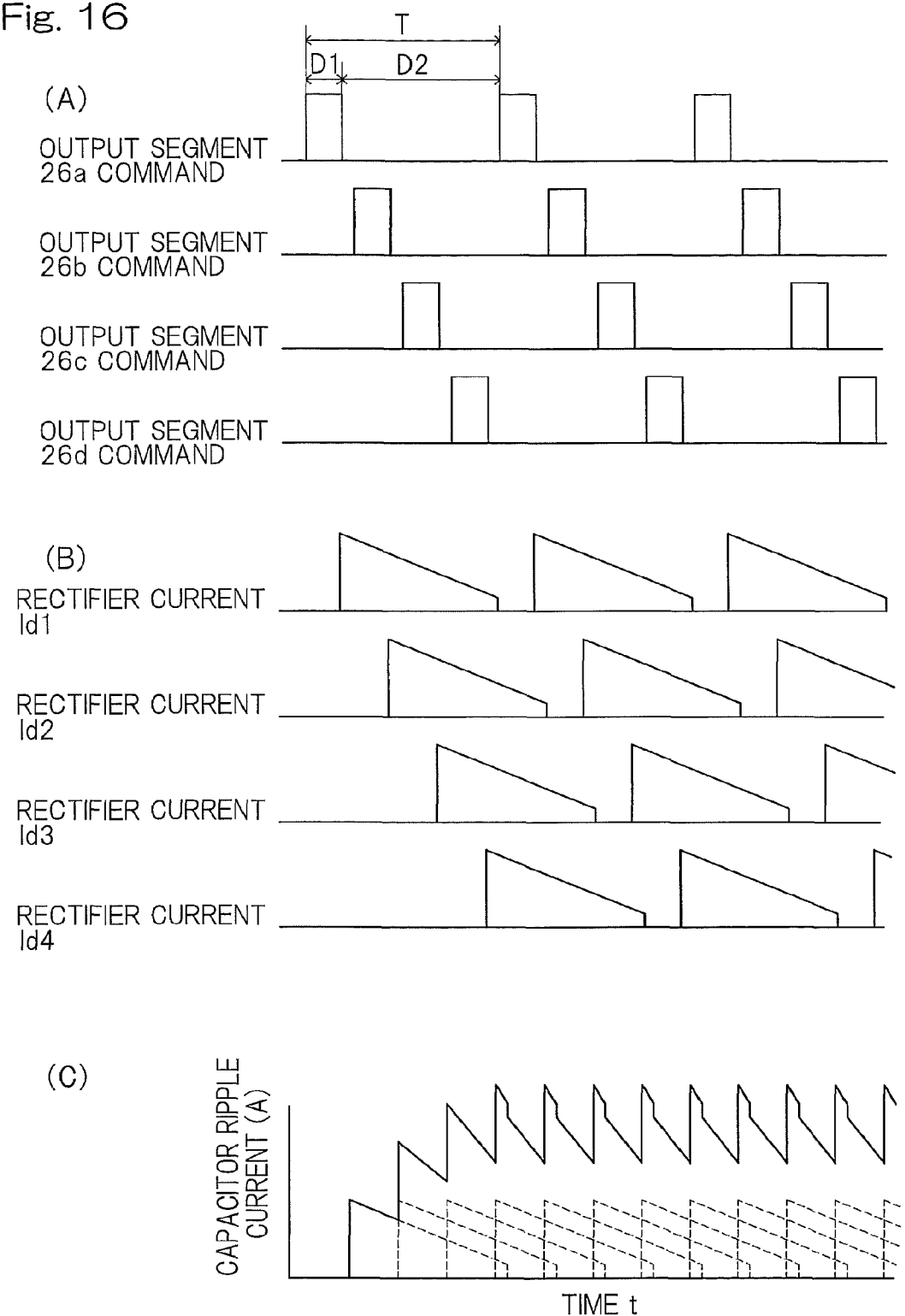
FIG. 16 shows chart (A) showing waveforms illustrative of examples of timings when an ON time of the booster unit ON operation is expanded, chart (B) showing waveforms illustrative of rectifier currents thereof, chart (C) showing waveforms of capacitor ripple currents thereof.
Figure 17:
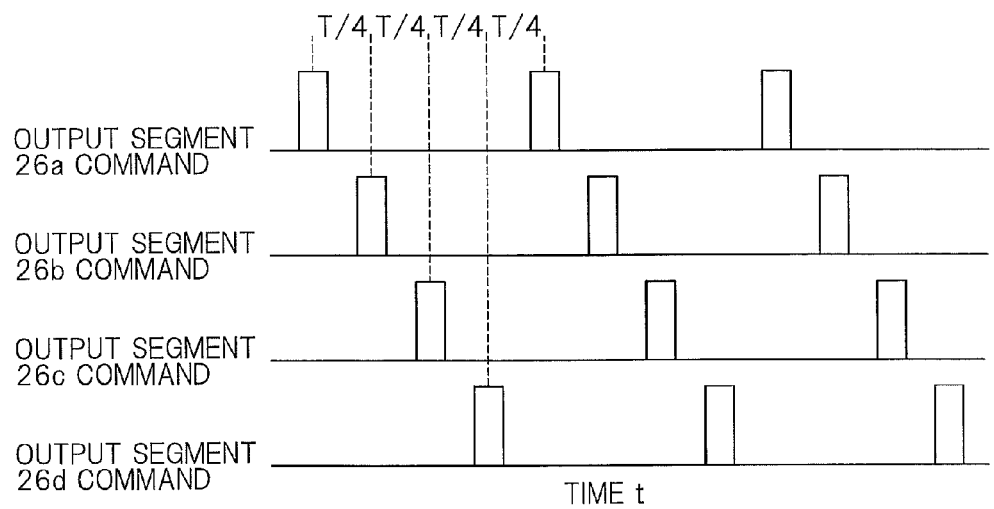
FIG. 17 is a chart showing waveforms illustrative of different examples of the timings of the ON operation of the booster unit.
Figure 18:
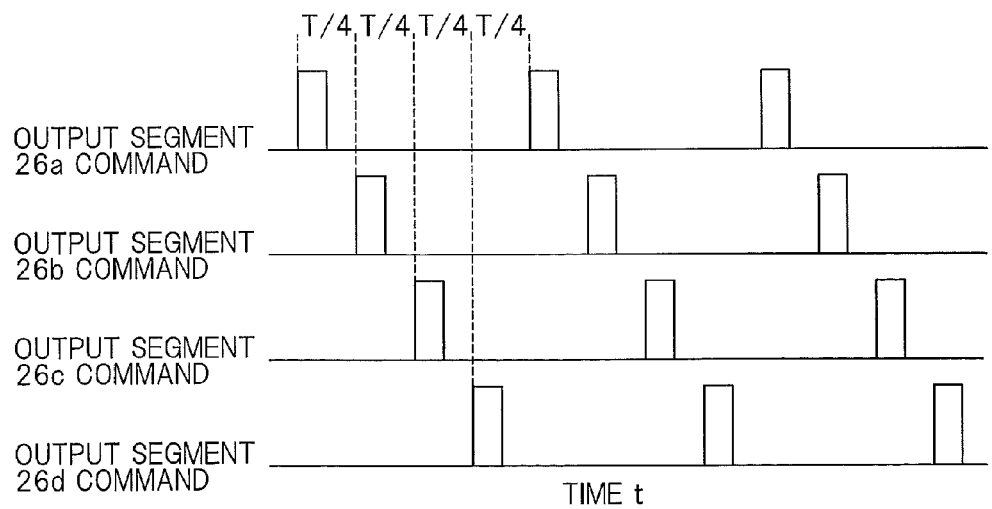
FIG. 18 is a chart showing waveforms illustrative of further different examples of the ON operation of the booster unit.

Charts (A) to (C) of FIG. 16 illustrate the case in which the ON time D1 of each of the driving elements 27 is expanded, and the supply current can be changed. In the booster unit 25, although not shown, the voltage applied across the load shown in FIG. 14 is monitored, the ON time (duty) of the PWM is made variable, and the output voltage is determined in dependence on the load. Since the ripple current can be reduced when the timings of the output current of the plurality of the driving elements 27 are displaced, setting the ON operation timing of each of the driving elements 27 to an equal interval is highly efficient. In FIG. 17, the timing is so determined that the equal interval can be established with respect to the center of the ON operation time. In FIG. 18, the timing is so determined that the equal interval can be established with respect to the start of each ON operation time.

Also, control is made so that all of the plurality of the driving elements 27 may not be switched ON at the same time. If all of the driving elements 27 are switched ON simultaneously, the OFF time will not overlap and, therefore, the output current of the booster unit 25 becomes intermittent and the ripple current increases accordingly.

Figure 20:
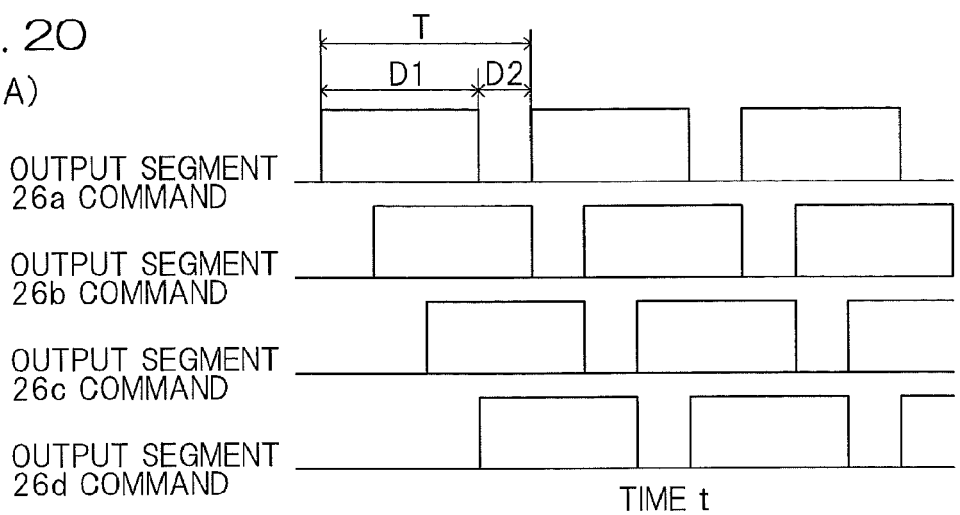
FIG. 20 shows chart (A) showing waveforms illustrative of still further different examples of the timings of the ON operation of the booster unit, chart (B) showing waveforms of the rectifier current thereof and chart (C) showing waveforms of the capacitor ripple current thereof.

Charts (A) to (C) of FIG. 19 illustrate the ON timing and the current waveforms of the driving elements 27. Charts (A) to (C) of FIG. 19 show a status where either one of the plurality of the driving elements 27 is switched ON constantly. In this case, since the input current of the circuit becomes continuous, pulsations of the current supplied from the battery can be reduced. Also, distortions of the output current such as observed in charts (A) to (C) of FIG. 15 and charts (A) to (C) of FIG. 16 can also be reduced. Charts (A) to (C) of FIG. 20 illustrate the case in which either one of the driving elements 27 is held in an OFF state so that the OFF timings of the driving elements 27 does not overlap and the current does not become intermittent. In this case, as can readily be understood from the diagram, the ripple of the output current becomes smallest. Also, when the timing is fixed at the proportion of ON and OFF shown in charts (A) to (C) of FIG. 19 or charts (A) to (C) of FIG. 20, in which the ripple current is small, and the cycle of the PWM is made variable, the output current can be controlled.

Figure 21:
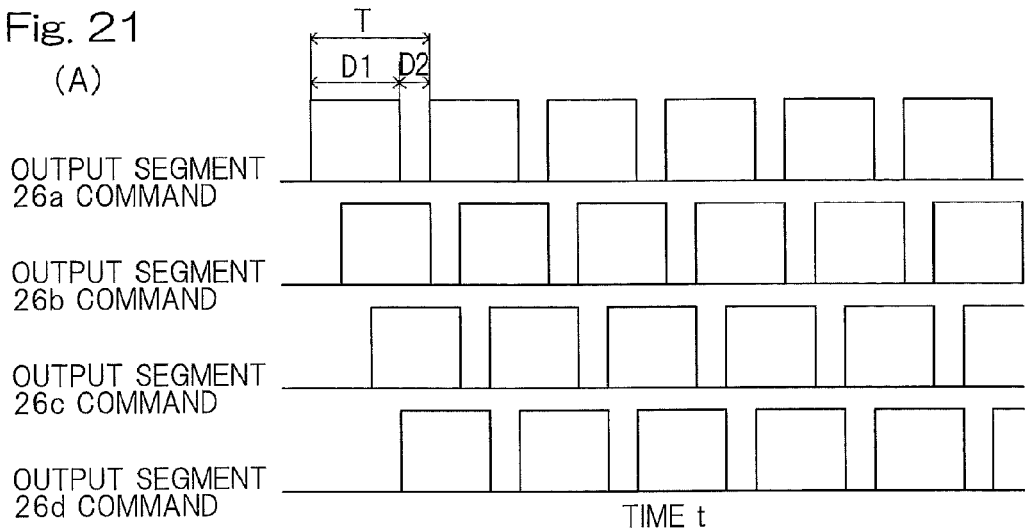
FIG. 21 shows chart (A) showing waveforms illustrative of yet further different examples of the timings of the ON operation of the booster unit, chart (B) showing waveforms of the rectifier current thereof and chart (C) showing waveforms of the capacitor ripple current thereof.

Charts (A) to (C) of FIG. 21 illustrate the cycles which are half of the cycles shown in charts (A) to (C) of FIG. 20. The output current will decrease if the cycle is shortened because the pulse width for one time becomes shorter. Conversely, if the cycle is prolonged, the output current will increase. In this instance, where the cycle is made variable, the proportion of ON and OFF timings is not limited to those shown in charts (A) to (C) of FIG. 19 or charts (A) to (C) of FIG. 20. It is possible to combine a variability of the cycle and a variability of the proportion of ON and OFF together. By way of example, where the range of the cycle that can be variable is set to a value higher than the audible range and the output is further increased from the upper limit of the cycle, and where the proportion of the ON operation time is increased or the output is large at the minimum value of the cycle setting, it is an operation to decrease the proportion of the ON operation time.

Figure 15:
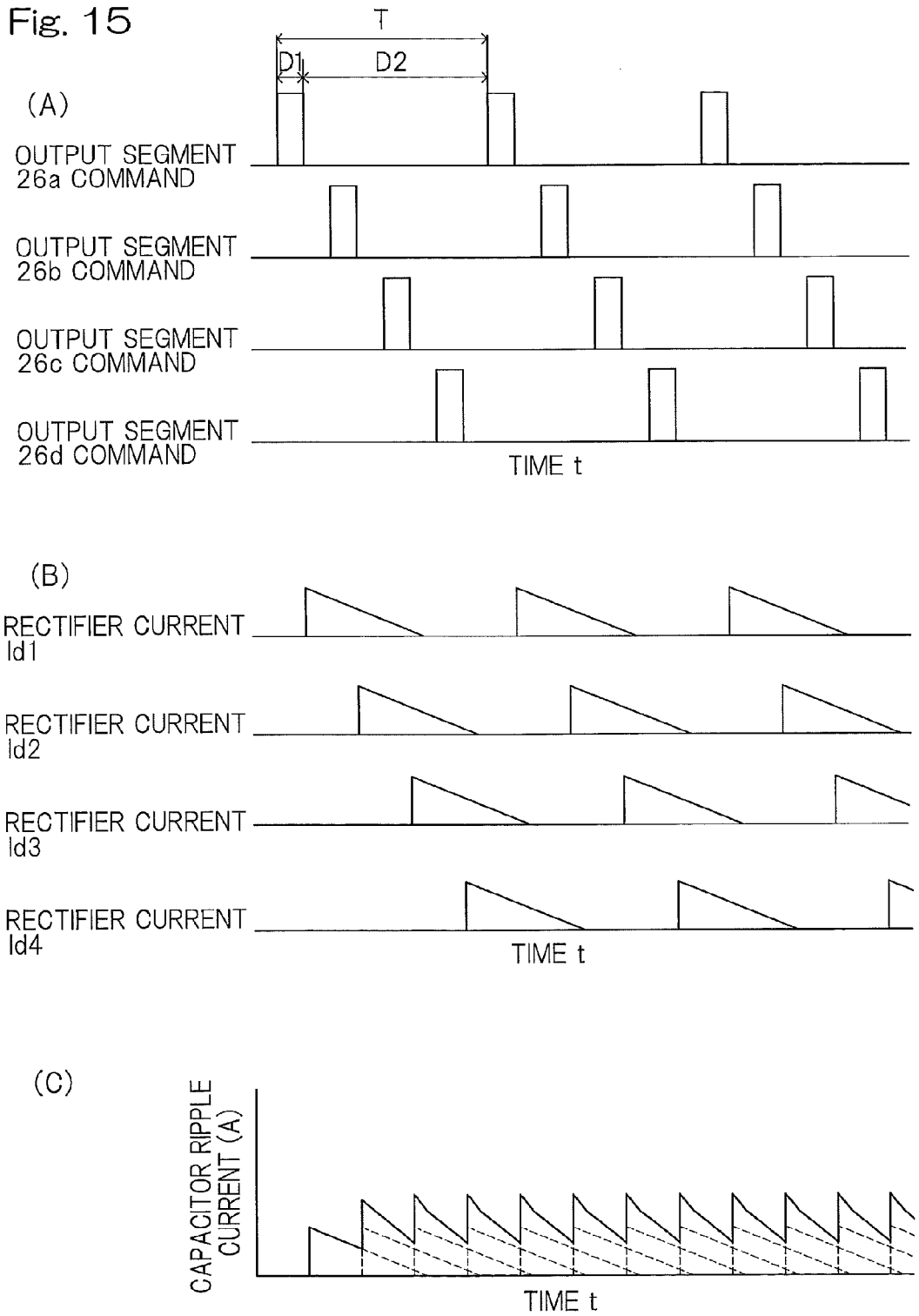
FIG. 15 shows chart (A) showing waveforms illustrative of timings at which an ON operation of the booster unit, chart (B) showing waveforms illustrative of rectifier currents thereof and chart (C) showing waveforms illustrative of capacitor ripple currents thereof.

Also, the rectifier 29 (See FIG. 14.) used in the booster circuit 25 is such that the driving element 27 assumes an ON state from a condition, in which the rectifier 29 conducts in a forward direction (from left to right as viewed in FIG. 14) when the driving element 27 is turned off, but when a reverse voltage is instantaneously applied, a reverse recovery current (from right to left of the rectifier) flows. Since this reverse recovery current is a source of generation of noises, in order to stop it, it is recommended that no conduction of the rectifier in the forward direction occur during the timing in which the driving element 27 is turned on. It will be discussed with reference to the rectifier current waveforms shown in chart (B) of FIG. 15 and chart (B) of FIG. 16. Chart (B) of FIG. 15 shows a case in which before the driving element 27 becomes ON, energies of the reactor have been consumed and the rectifier 29 is not therefore conducting. Chart (B) of FIG. 16 shows a case in which during the rectifier 29 conducting the driving element 27 is turned on. The rectifier current is instantaneously zero at the timing at which the driving element 27 is turned on. Although not shown, the case shown in Chart (B) of FIG. 16 a reverse current flows instantaneously at the timing at which the driving element 27 is turned on. In other words, the on and off timings are controlled so that the conduction in the forward direction terminates at the timing at which the driving element 27 is turned on and, it may be set that by rendering the cycle to be variable the output voltage may be controlled.

Figure 22:
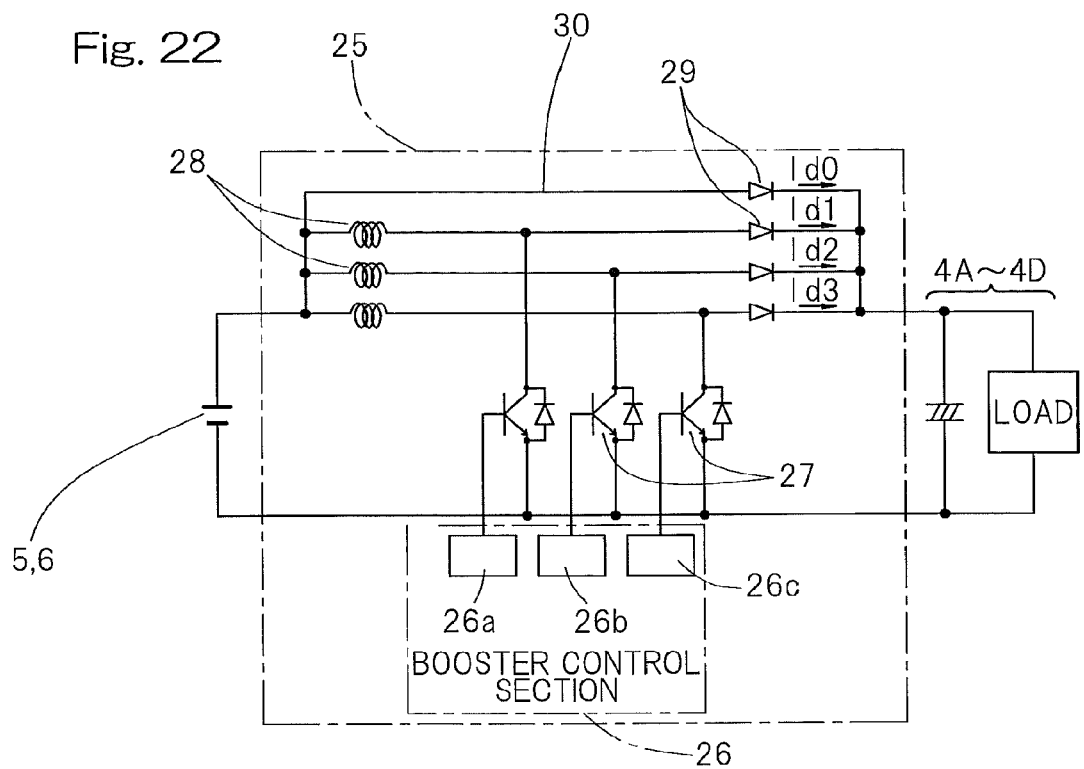
FIG. 22 is a schematic diagram showing a different example of the configuration construction of the booster unit in the driving device.

FIG. 22 illustrates a different example of the circuit construction of the booster unit 25. In this example of the circuit construction, a bypass path 30 for supplying an electric current from the source to the motor drivers 4A to 4D without flowing through those rectors 28 is connected in parallel to a plurality of booster circuits, which include the reactor 28 and the rectifier 29 and are connected in parallel to each other. This bypass path 30 is comprised of a rectifier.

Figure 23:
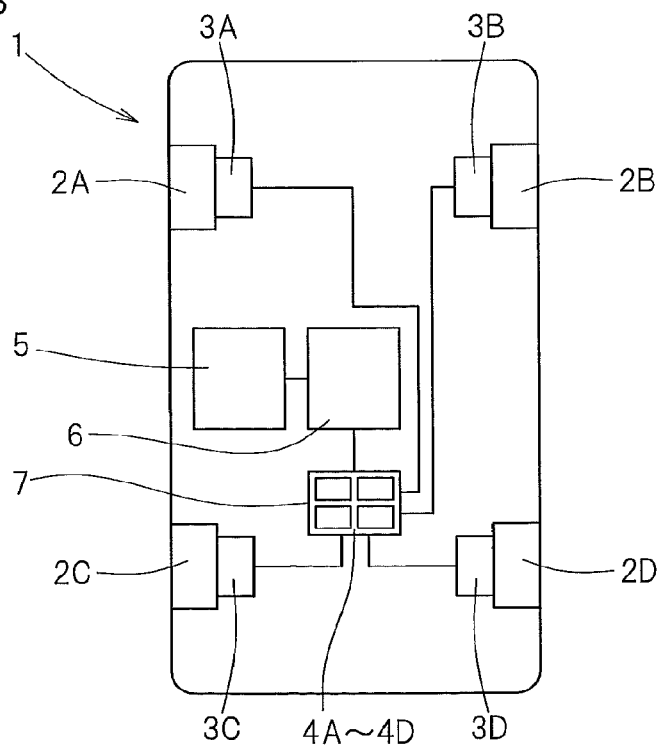
FIG. 23 is a schematic diagram showing the configuration construction of component parts in one example of the in-wheel motor vehicle to which the present invention is applied.

In the booster unit 25, a boosting voltage is determined in dependence on the number of rotation of the in-wheel motor. In other words, when the number of rotation is lower than a predetermined value, no boosting operation takes place. As shown in FIG. 23, with the conventional circuit construction of the booster unit, even when no boosting operation take place, the electric current is supplied from the power source through the reactor 38. The reactor 38 has a resistance of about a few tens to some hundred ohms and, under a driving condition in which the drive current exceeds 100 amperes such as observed in the in-wheel motor, the loss resulting from this resistance cannot be negligible. Accordingly, where the bypass path 30 such as shown in FIG. 22 is employed, the loss during a low speed drive can be reduced.

Figure 24:
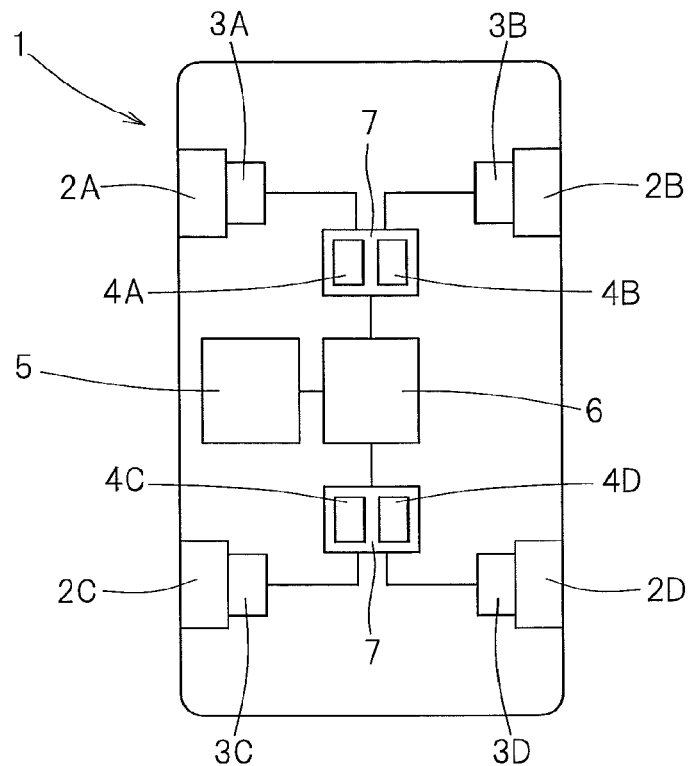
FIG. 24 is a schematic diagram showing the configuration construction of component parts in another example of the in-wheel motor vehicle to which the present invention is applied.

It is to be noted that in describing any one of the foregoing embodiments of the present invention, reference has been made to the in-wheel motor vehicle 1, which is, as shown in FIG. 23, the electric-powered vehicle or fuel cell-powered vehicle of a four wheel drive type, in which in-wheel motor assemblies 3A to 3D are disposed in the front left and right wheels and also in the rear left and right wheels (the same as that in shown in FIGS. 1 and 8), with the four motor drivers 4A to 4D associated respectively with the in-wheel motor assemblies 3A to 3D and having been put together at one location. However, in the same four wheel drive type electric-powered vehicle or fuel cell-powered vehicle, as shown in FIG. 24, the two motor drivers 4A and 4B, associated respectively with the in-wheel motor assemblies 3A and 3B incorporated in, for example, the front left and right wheels, may be put together at one location in a front portion of the vehicle, in which case the two motor drivers 4C and 4D associated respectively with the in-wheel motor assemblies 3C and 3D incorporated in the rear left and right wheels are put together at one location in a rear portion of the vehicle.

Figure 25:
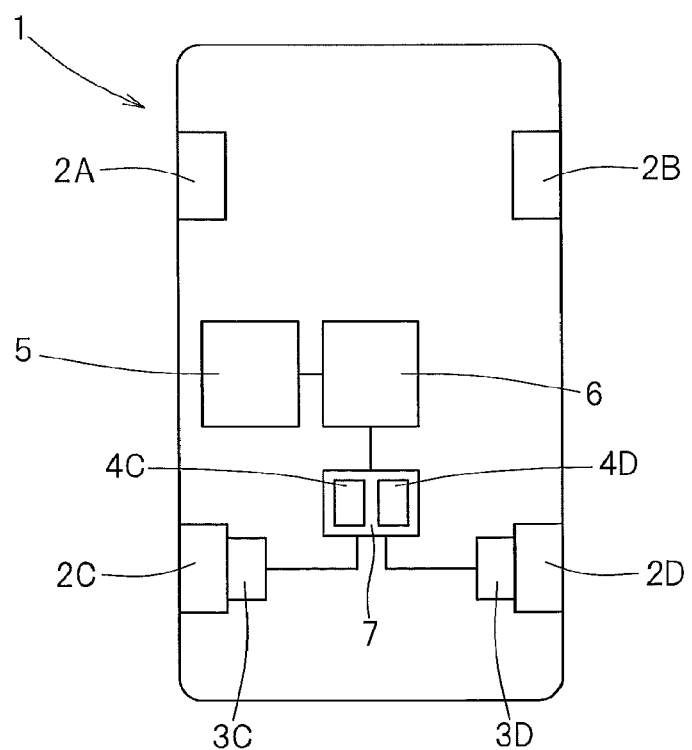
FIG. 25 is a schematic diagram showing the configuration construction of component parts in a different example of the in-wheel motor vehicle to which the present invention is applied.

Also, the present invention is applicable to the in-wheel motor vehicle 1 which is a two wheel drive vehicle as shown in FIG. 25 or a hybrid vehicle of a type, in which the front left and right wheels or the rear left and right wheels is driven by an internal combustion engine (In FIG. 25, an example is shown in which the in-wheel motor assemblies 3C and 3D are incorporated in the rear left and right wheels, respectively.), provided that the two motor drivers 4C and 4D, associated respectively with the two in-wheel motor assemblies 3C and 3D, are put together at one location.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . In-wheel motor vehicle
2A to 2D . . . Wheel
3A to 3D . . . In-wheel motor assembly
4A to 4D . . . Motor driver
7 . . . Casing
10 . . . Main body of motor driver
11 . . . Smoothing circuit
12, 12A to 12D . . . Inverter control unit
13 . . . Inverter unit
14 . . . Cooler
15, 27 . . . Driving element
22 . . . Calculator
25 . . . Booster unit
26 . . . Booster control section
28 . . . Reactor
29 . . . Rectifier
30 . . . Bypass path

What is claimed is:

1. A driving device for an in-wheel motor vehicle, which comprises:
a plurality of in-wheel motor assemblies incorporated in at least two of a plurality of drive wheels of the vehicle; and
a plurality of motor drivers for controlling the respective in-wheel motor assemblies, the motor drivers including a smoothing circuit, an inverter unit and an inverter control unit connected to the inverter unit for directly controlling a switching operation of the inverter unit and a single cooler for cooling the inverter unit and the smoothing circuit;
wherein the smoothing circuit includes a capacitor in an input stage and smooths a direct current power supplied from a battery,
the inverter unit includes a plurality of driving elements each configured to perform switching so as to convert a direct current power, inputted thereto via the smoothing circuit, into a three phase alternating current through an intermittent control of the driving elements,
the inverter control unit includes
a first calculator to directly determine ON and OFF timings of the driving elements in the inverter unit to thereby directly control number of rotation or torque of a motor of the in-wheel motor assembly;
a pre-driver circuit to control ON and OFF of the driving elements in the inverter unit in dependence on a command from the calculator; and
a sensor circuit to calculate angle of rotation from a signal of a phase detector provided in each of the in-wheel motor assembly,
the cooler is in the form of a water cooling type and has a plate shape or a thin box-like shape,
the plurality of the motor drivers are disposed within a single common casing and, the plurality of the motor drivers all commonly share the first calculator of the inverter control unit and the capacitor of the smoothing circuit which are component parts of those motor drivers, and
a main body, including the inverter control unit and the inverter unit, is disposed on one side of the single cooler with the inverter unit held at a position close to a cooling surface of the single cooler.

2. The driving device for an in-wheel motor vehicle as claimed in claim 1, further comprising a booster unit for boosting a power supply voltage from a power source, the booster unit including a booster control section, a driving element, a reactor and a rectifier, the booster unit being disposed within the common casing.

3. The driving device for an in-wheel motor vehicle as claimed in claim 1, wherein the plurality of the motor drivers disposed within the common casing share the smoothing circuit.

4. The driving device for an in-wheel motor vehicle as claimed in claim 1, wherein the plurality of the motor drivers disposed within the common casing share the single cooler.

5. The driving device for an in-wheel motor vehicle as claimed in claim 1, wherein the inverter units of the plurality of the motor drivers are integrated together so that at least a portion of each of the inverter units is shared.

6. The driving device for an in-wheel motor vehicle as claimed in claim 1, wherein each of the motor drivers comprises a booster unit for boosting a power supply voltage from an power source, the booster unit including a booster control section, a driving element, a reactor and a rectifier, and
wherein the plurality of the motor drivers are integrated together so that the inverter control units and the booster control sections of the booster units are at least partially shared among the plurality of the motor drivers.

7. The driving device for an in-wheel motor vehicle as claimed in claim 6, wherein the booster control section includes a second calculator and
wherein with the first calculator of the inverter control unit and the second calculator of the booster control section being shared, the inverter control unit and the booster control section are integrated together.

8. The driving device for an in-wheel motor vehicle as claimed in claim 5, wherein the inverter control unit of the plurality of the motor drivers is of a control type capable of driving the driving element of the inverter unit according to the PWM scheme and the plurality of the motor drivers have equal cycles of PWM relative to each other and are configured to displace an ON and OFF timings of the driving element.

9. The driving device for an in-wheel motor vehicle as claimed in claim 7, wherein the booster unit includes a plurality of driving elements and a plurality of reactors for one booster control section.

10. The driving device for an in-wheel motor vehicle as claimed in claim 9, wherein the booster control section of the booster unit drives a plurality of the driving elements according to the PWM scheme and render PWM cycles of the plurality of the driving elements to be equal to each other to displace the ON and OFF timings of each of those driving elements.

11. The driving device for an in-wheel motor vehicle as claimed in claim 10, wherein the booster control section of the booster unit changes the PWM cycle of the plurality of the driving elements.

12. The driving device for an in-wheel motor vehicle as claimed in claim 9, which comprises a bypass path for supplying an electric current with the reactor being bypassed.

13. The driving device for an in-wheel motor vehicle as claimed in claim 1, wherein the vehicle is an electric-powered vehicle or a fuel cell-powered vehicle having ones of front left and right wheels and rear left and right wheels that are driven by the in-wheel motor assemblies.

14. The driving device for an in-wheel motor vehicle as claimed in claim 1, wherein the vehicle is a hybrid vehicle having at least ones of front left and right wheels and rear left and right wheels that are driven by the in-wheel motor assemblies and also having the others of front left and right wheels and rear left and right wheels that are driven by an internal combustion engine.

* * * * *